United States Patent [19]

Chalmers et al.

[11] 3,925,376

[45] Dec. 9, 1975

[54] PIPERIDINE DERIVATIVES

[75] Inventors: Alexander Michael Chalmers, Cheadle Hulme; James Jack, Bramhall; Barry Cook, Manchester, all of England

[73] Assignee: Ciba-Geigy Corporation, Ardsley, N.Y.

[22] Filed: Apr. 11, 1973

[21] Appl. No.: 350,296

[30] Foreign Application Priority Data

Apr. 21, 1972   United Kingdom............... 18558/72
Feb. 3, 1973    United Kingdom................ 5469/73

[52] U.S. Cl....... 260/248 CS; 260/249.5; 260/249.8; 260/249.6; 260/45.8 N; 260/256.4 C; 260/256.4 R; 260/256.5 R

[51] Int. Cl.²...................................... C07D 251/26

[58] Field of Search........ 260/248 CS, 249.6, 249.5, 260/249.8

[56] References Cited
UNITED STATES PATENTS

| | | | |
|---|---|---|---|
| 3,156,689 | 11/1964 | Dexter et al. | 260/249.8 X |
| 3,156,690 | 11/1964 | Dexter et al. | 260/249.8 X |
| 3,734,883 | 5/1973 | Holt | 260/45.8 N |

FOREIGN PATENTS OR APPLICATIONS 2,227,689   12/1972   Germany

*Primary Examiner*—John M. Ford
*Attorney, Agent, or Firm*—Nestor W. Shust

[57] ABSTRACT

New piperidine derivatives of 1,3-pyrimidine and 1,3,5-triazine are used as stabilisers for organic materials, especially for polymers.

11 Claims, No Drawings

PIPERIDINE DERIVATIVES

The present invention relates to new compounds useful as stabilisers for organic material and in particular to new piperidine derivatives useful for the stabilisation of polymers.

In British Pat. Specification No. 977,587 there are described compounds having the formula:

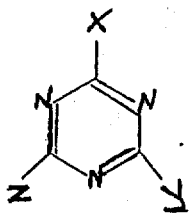

wherein X, Y and Z may be, inter alia, substituted aryl groups, each bound to the ring carbon atom by an —S—, —O—, >N-benzyl > N-lower alkyl or —NH— group. The compounds are said to stabilise organic material against oxidative deterioration.

We have now found that a further class of compounds, related to those of British Specification No. 977,587, confer on polymeric material an exceptionally high degree of stability towards thermal — and especially photo — degradation.

Accordingly, the present invention provides a compound having the formula:-

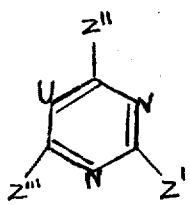 I and salts thereof, wherein U is —CH— or —N— and $Z'$ is a residue having the formula

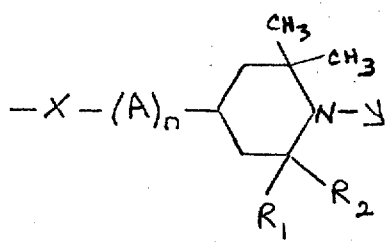 II wherein $R_1$ and $R_2$ are the same or different and each is a straight- or branched alkyl residue having from 1 to 12 carbon atoms, or $R_1$ and $R_2$ form, together with the ring carbon atom to which they are each bound, a cycloalkyl residue having from 5 to 12 carbon atoms; X is an

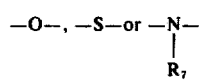

residue, wherein $R_7$ is hydrogen, a straight or branched alkyl residue having from 1 to 20 carbon atoms or an aralkyl residue having from 7 to 12 carbon atoms; Y is 0°, hydrogen, a straight or branched alkyl residue having from 1 to 20 carbon atoms, an alkenyl or alkynyl residue having from 3 to 12 carbon atoms, an aralkyl residue having from 7 to 12 carbon atoms or the group

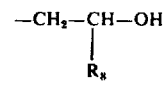

wherein $R_8$ is hydrogen, or a methyl or phenyl residue; $n$ is 0 or 1; and A is —CH$_2$—, or the group

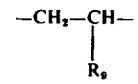

wherein $R_9$ is hydrogen or an alkyl residue having from 1 to 20 carbon atoms; $Z''$ and $Z'''$ are the same or different and each is a piperidine residue of formula II as hereinbefore defined, a halogen atom, a substituted amino group having the formula:-

 III wherein $R_3$ and $R_4$ are the same or different and each is hydrogen, a straight- or branched alkyl residue having from 1 to 20 carbon atoms, a cycloalkyl residue having from 5 to 12 carbon atoms, an aryl residue which is unsubstituted or substituted by one or more alkyl groups and having a total of from 6 to 18 carbon atoms or an aralkyl residue having from 7 to 12 carbon atoms; or $R_3$ and $R_4$, together with the nitrogen atom to which they are bound form a heterocyclic residue having 5 to 7 ring atoms; or $Z''$ and $Z'''$ are an hydroxy or ether group having the formula:-

 IV wherein $R_5$ is hydrogen, a straight- or branched- chain alkyl residue having from 1 to 20 carbon atoms, a cycloalkyl residue having from 5 to 12 carbon atoms, an aryl residue which may be unsubstituted or substituted by one or more alkyl groups, having a total of 6 to 18 carbon atoms or an aralkyl residue having from 7 to 12 carbon atoms; or $Z''$ and $Z'''$ are a thiol or thio ether group having the formula:

 V wherein $R_6$ is hydrogen, a straight- or branched alkyl residue having from 1 to 20 carbon atoms, a cycloalkyl, having from 5 to 12 carbon atoms or a phenyl or benzyl residue.

Preferably, the ring atom U is —N—.

Examples of alkyl substituents $R_1$ and $R_2$ include methyl, ethyl, n-propyl, isopropyl, n-butyl, secbutyl, n-hexyl, n-octyl and n-dodecyl residues; however, preferred alkyl residues $R_1$ and $R_2$ are those having from 1 to 4 carbon atoms and most preferably $R_1$ and $R_2$ are each a methyl residue.

When the residue $R_1$ and $R_2$, together with the carbon atom to which they are bound, form a cycloalkyl group, examples of such cycloalkyl groups are those of formula:

  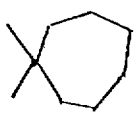

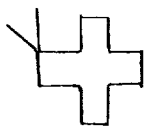 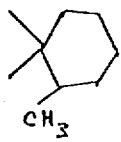

Examples of the residue X are —O—, —S—, —NH— and —NR$_7$— wherein $R_7$ is a methyl, ethyl, isobutyl, n-hexyl, n-decyl, n-eicosyl or benzyl residue. Preferably, however, X is —O— or —NH—.

Examples of Y, apart from hydrogen and O, are methyl, ethyl, n-propyl, isopropyl, n-butyl, sec-butyl, n-hexyl, n-octyl, n-dodecyl, allyl, α-methallyl, 10-undecenyl, prop-2-ynyl, benzyl, α-methylbenzyl, p-methylbenzyl, p-methyl-α-methylbenzyl, α-naphthylmethyl and β-hydroxyethyl, β-hydroxypropyl or β-hydroxy-β-phenyl ethyl residues. Particularly preferred substitutent Y however are hydrogen and straight or branched alkyl residues having from 1 to 4 carbon atoms, the most preferred substituents being hydrogen and methyl residues.

Examples of residue A when n is 1 are —CH$_2$—, and

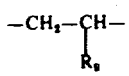

wherein $R_9$ is hydrogen, a methyl, ethyl, isopropyl, sec-butyl, n-hexyl, n-decyl or n-eicosyl residue. Preferably $R_9$ is hydrogen and preferably, either n is 0 or n is 1 and A is —CH$_2$CH$_2$—.

A particular sub-group of Z'' and/or Z''' are substituted amine groups -NR$_3$R$_4$ wherein examples of substituents $R_3$ and $R_4$, apart from hydrogen, are methyl, ethyl, n-propyl, isopropyl, n-butyl, sec-butyl, n-hexyl, n-octyl, n-dodecyl, n-eicosyl, cyclopentyl, cyclohexyl, cyclododecyl, p-methylphenyl, p-t-butylphenyl, p-n-dodecylphenyl, benzyl, α-methylbenzyl and α-naphthylmethyl residues; substituents $R_3$ and $R_4$ are, however, preferably hydrogen or an alkyl residue having from 6 to 20 carbon atoms.

When the residues $R_3$ and $R_4$ together with the nitrogen atom to which they are bound form a heterocyclic residue, the heterocycle may contain further heteroatoms such as a further nitrogen atom or an oxygen atom to which they are bound. Examples of such heterocyclic residues are pyrrolidin-1-yl, piperidino, 2-methylpiperidino, 4-n-hexylpiperidino, morpholino, piperazin-1-yl, 2-methylhexahydroazepin-1-yl; preferred heterocyclic residues, however, are morpholino and piperidino residues.

Examples of substituent $R_5$, apart from hydrogen, are methyl, ethyl, n-propyl, isopropyl, n-butyl, sec-butyl, n-hexyl, n-octyl, n-dodecyl, n-eicosyl, cyclopentyl, cyclohexyl, cyclododecyl, phenyl, p-methylphenyl, t-butylphenyl, p-n-dodecylphenyl, benzyl, α-methylbenzyl, p-methyl-α-methylbenzyl and α-naphthylmethyl residues; substituent $R_5$ is, however, preferably an alkyl group having from 6 to 20 carbon atoms.

Examples of substituent $R_6$, apart from hydrogen, are methyl, ethyl, n-propyl, isopropyl, n-butyl, secbutyl, n-hexyl, n-octyl, n-dodecyl, n-eicosyl, cyclopentyl, cyclohexyl, cyclododecyl, phenyl and benzyl. The preferred substituent $R_6$ is an alkyl residue having from 6 to 20 carbon atoms.

Preferably, Z'' and Z''' are each the same or different piperidine residue II. In less preferred embodiments, Z'' and/or Z''' are halogen, preferably chlorine, N-alkyl substituents or S-alkyl substituents.

The invention also includes salts of the compounds of formula I for instance salts of inorganic acids such as phosphates, carbonates, sulphates and chlorides and salts of organic acids such as acetates, stearates, maleates, citrates, tartrates, oxalates, benzoates and substituted carbamic acids.

A preferred sub-group of compounds are those having the formula:-

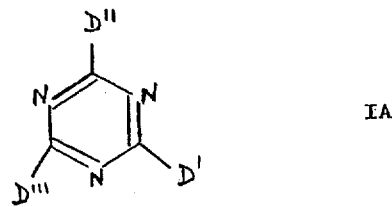

IA wherein D', D'' and D''' are the same or different and each is halogen or a residue of formula:-

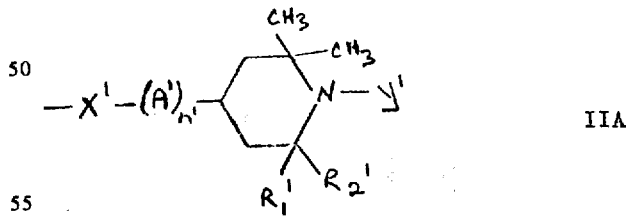

IIA wherein $R_1'$ and $R_2'$ are the same or different and each is a straight or branched alkyl residue having from 1 to 12 carbon atoms, or $R_1'$ and $R_2'$, together with the carbon atom to which they are bound, form a cycloalkyl residue having from 5 to 12 carbon atoms, X' is an —O—, —S— or —NR$_7'$— residue wherein $R_7'$ is hydrogen, an alkyl residue having from 1 to 12 carbon atoms or an aralkyl residue having from 7 to 12 carbon atoms, Y' is 0, hydrogen, an alkyl residue having from 1 to 12 carbon atoms, an alkenyl or alkynyl residue having from 3 to 12 carbon atoms, an aralkyl residue having from 7 to 12 carbon atoms or the group:

$$-CH_2-\underset{R_8'}{CH}-OH$$

wherein $R_8'$ is hydrogen, or a methyl or phenyl residue, $n'$ is 0 or 1 and $A'$ is $-CH_2-$, or $$-CH_2-\underset{R_9'}{CH}-$$

wherein $R_9'$ is hydrogen or an alkyl residue having from 1 to 12 carbon atoms; with the proviso that at least one of D', D" and D'" is not a halogen atom; and salts of these compounds.

Within the group of compounds of formula IA, these compounds are preferred wherein D', D" and D'" are the same or different piperidine residue of formula IIA. More preferably, residues D', D" and D'" are the same piperidine residue IIA. It is also preferred that X is —O— or —NH—, $n$ is 0, $R_1$ and $R_2$ are each a methyl residue and Y is hydrogen or an alkyl residue having from 1 to 4 carbon atoms, especially a methyl residue.

A further sub-group of preferred compounds of formula I are those of formula:

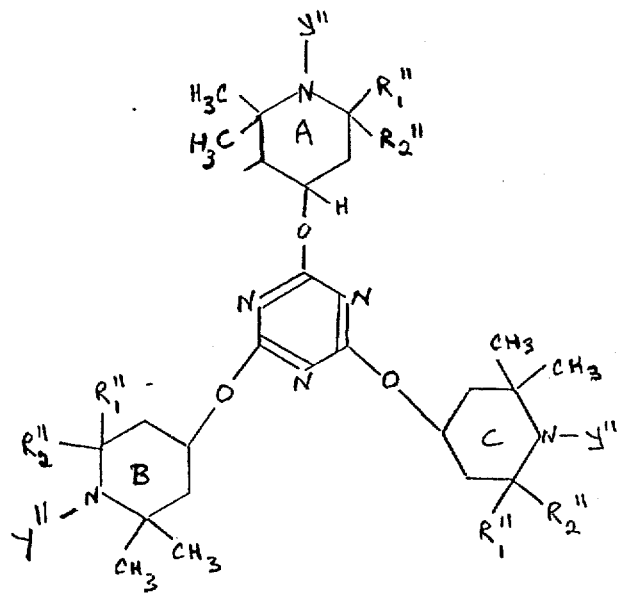

IB wherein $R_1''$ and $R_2''$ are the same or different and each is a straight- or branched-chain alkyl group having from 1 to 12 carbon atoms or $R_1''$ and $R_2''$, together with the carbon atom to which they are each bound, form a cycloalkyl residue having from 5 to 12 carbon atoms, and Y" is hydrogen, a straight- or branched-chain alkyl group having from 1 to 12 carbon atoms, an alkenyl group having from 3 to 12 carbon atoms or an aralkyl group having from 7 to 12 carbon atoms; and salts of these compounds.

It is preferred that substituents $R_1''$, $R_2''$ and each a methyl residue and that Y" is hydrogen or a lower alkyl residue, especially a methyl residue.

Specific examples of compounds of formula I include:

2,4,6-tris[2',2',6',6'-tetramethylpiperidinyl-4'-amino]-1,3-pyrimidine 2,4,6-tris[1',2',2',6',6'-pentamethylpiperidinyl-4'-amino]-1,3-pyrimidine 6-chloro-2,4-bis[2',2',6',6'-tetramethylpiperidinyl-4'-amino]-1,3-pyrimidine 6-chloro-2,6-bis[1'-ethyl-2',2',6',6'-tetramethylpiperidinyl-4'-amino]-1,3-pyrimidine 4,6-dichloro-2-[2',2',6',6'-tetramethylpiperidinyl-4'-amino]-1,3-pyrimidine 2-methylamino-4,6-bis[2',2',6',6'-tetramethylpiperidinyl-4'-amino]-1,3,5-triazine 2-ethylamino-4,6-bis[2',2',6',6'-tetramethylpiperidinyl-4'-amino]-1,3,5-triazine 2-iso-propylamino-4,6-bis[2',2',6',6'-tetramethylpiperidinyl-4'-amino]-1,3,5-triazine 2-n-hexylamino-4,6-bis[2',2',6',6'-tetramethylpiperidinyl-4'-amino]-1,3,5-triazine 2-n-octydecylamino-4,6-bis[2',2',6',6'-tetramethylpiperidinyl-4'-amino]-1,3,5-triazine 2-cyclopentylamino-4,6-bis[2',2',6',6'-tetramethylpiperidinyl-4'-amino]-1,3,5-triazine 2-cyclohexylamino-4,6-bis[2',2',6',6'-tetramethylpiperidinyl-4'-amino]-1,3,5-triazine 2-cyclododecylamino-4,6-bis[2',2',6',6'-tetramethylpiperidinyl-4'-amino]-1,3,5-triazine 2-dimethylamino-4,6-bis[2',2',6',6'-tetramethylpiperidinyl-4'-amino]-1,3,5-triazine 2-ethyl-n-propylamino-4,6-bis[2',2',6',6'-tetramethylpiperidinyl-4'-amino]-1,3,5-triazine 2-methyl-n-decylamino-4,6-bis[2',2',6',6'-tetramethylpiperidinyl-4'-amino]-1,3,5-triazine 2-anilino-4,6-bis[2',2',6',6'-tetramethylpiperidinyl-4'-amino]-1,3,5-triazine 2-(p-t-butylanilino)-4,6-bis[2,2',6',6'-tetramethylpiperidinyl-4'-amino]-1,3,5-triazine 2-(p-methylanilino)-4,6-bis[2',2',6',6'-tetramethylpiperidinyl-4'-amino]-1,3,5-triazine 2-(p-n-dodecylanilino)-4,6-bis[2',2',6',6'-tetramethylpiperidinyl-4'-amino]-1,3,5-triazine 2-benzylamino-4,6-bis[2',2',6',6'-tetramethylpiperidinyl-4'-amino]-1,3,5-triazine 2-α-naphthylmethylamino-4,6-bis[2',2',6',6'-tetramethylpiperidinyl-4'-amino]-1,3,5-triazine 2-amino-4,6-bis[2',2',6',6'-tetramethylpiperidinyl-4'-amino]-1,3,5-triazine 2-hydroxy-4,6-bis[2',2',6',6'-tetramethylpiperidinyl-4'-amino]-1,3,5-triazine 2-methoxy-4,6-bis[2',2',6',6'-tetramethylpiperidinyl-4'-amino]-1,3,5-triazine
2-ethoxy-4,6-bis[2',2',6',6'-tetramethylpiperidinyl-4'-amino]-1,3,5-triazine
2-n-decyloxy-4,6-bis[2',2',6',6'-tetramethylpiperidinyl-4'-amino]-1,3,5-triazine
2-n-eicosyloxy-4,6-bis[2',2',6',6'-tetramethylpiperidinyl-4'-amino]-1,3,5-triazine
2-cyclohexyloxy-4,6-bis[2',2',6',6'-tetramethylpiperidinyl-4'-amino]-1,3,5-triazine
2-cyclododecyloxy-4,6-bis[2',2',6',6'-tetramethylpiperidinyl-4'-amino]-1,3,5-triazine
2-phenoxy-4,6-bis[2',2',6',6'-tetramethylpiperidinyl-4'-amino]-1,3,5-triazine
2-(p-t-butylphenoxy)-4,6-bis[2',2',6',6'-tetramethylpiperidinyl-4'-amino]-1,3,5-triazine
2-(p-n-dodecylphenoxy)-4,6-bis[2',2',6',6'-tetramethylpiperidinyl-4'-amino]-1,3,5-triazine
2-(2'-methylphenoxy)-4,6-bis[2',2',6',6'-tetramethylpiperidinyl-4'-amino]-1,3,5-triazine
2-benzyloxy-4,6-bis[2',2',6',6'-tetramethylpiperidinyl-4'-amino]-1,3,5-triazine
2-α-naphthylmethoxy-4,6-bis[2',2',6',6'-tetramethylpiperidinyl-4'-amino]-1,3,5-triazine
2-(α-methyl)-4,6-bis[2',2',6'6'-tetramethylpiperidinyl-4'-amino]-1,3,5-triazine
2-mercapto-4,6-bis[2',2',6',6'-tetramethylpiperidinyl-4'-amino]-1,3,5-triazine
2-methylthio-4,6-bis[2',2',6',6'-tetramethylpiperidinyl-4'-amino]-1,3,5-triazine
2-ethylthio-4,6-bis[2',2',6',6'-tetramethylpiperidinyl-4'-amino]-1,3,5-triazine
2-n-propylthio-4,6-bis[2',2',6',6'-tetramethylpiperidinyl-4'-amino]-1,3,5-triazine
2-n-dodecylthio-4,6-bis[2',2',6',6'-tetramethylpiperidinyl-4'-amino]-1,3,5-triazine
2-cyclopentylthio-4,6-bis[2',2',6',6'-tetramethylpiperidinyl-4'-amino]-1,3,5-triazine
2-cyclohexylthio-4,6-bis[2',2',6',6'-tetramethylpiperidinyl-4'-amino]-1,3,5-triazine
2-cyclododecylthio-4,6-bis[2',2',6',6'-tetramethylpiperidinyl-4'-amino]-1,3,5-triazine
2-morpholino-4,6-bis[2',2',6',6'-tetramethylpiperidinyl-4'-amino]-1,3,5-triazine
2-piperidino-4,6-bis[2',2',6',6'-tetramethylpiperidinyl-4'-amino]-1,3,5-triazine
2-(pyrrolidin-1''-yl)-4,6-bis[2',2',6',6'-tetramethylpiperidinyl-4'-amino]-1,3,5-triazine
2-(hexahydroazepin-1''-yl)-4,6-bis[2',2',6',6'-tetramethylpiperidinyl-4'-amino]-1,3,5-triazine
2,4-diamino-6-[2',2',6',6'-tetramethylpiperidinyl-4'-amino]-1,3,5-triazine
2,4-di(methylamino)-6-[2',2',6',6'-tetramethylpiperidinyl-4'-amino]-1,3,5-triazine
2,4-di(n-octylamino)6-[2',2',6',6'-tetramethylpiperidinyl-4'-amino]-1,3,5-triazine
2,4-di(benzylamino)-6-[2',2',6',6'-tetramethylpiperidinyl-4'-amino]-1,3,5-triazine
2,4-dianilino-6-[2',2',6',6'-tetramethylpiperidinyl-4'-amino]-1,3,5-triazine
2,4-dimethoxy-6-[2',2',6',6'-tetramethylpiperidinyl-4'-amino]-1,3,5-triazine
2,4-di-n-heptyloxy-6-[2',2',6',6'-tetramethylpiperidinyl-4'-amino]-1,3,5-triazine
2,4-di-n-tetradecyloxy -6-[2',2',6',6'-tetramethylpiperidinyl-4'-amino]-1,3,5-triazine
2,4-dihydroxy-6-[2',2',6',6'-tetramethylpiperidinyl-4'-amino]-1,3,5-triazine
2,4-dimercapto-6-[2',2',6',6'-tetramethylpiperidinyl-4'-amino]-1,3,5-triazine
2,4-dimethylthio-6-[2',2',6',6'-tetramethylpiperidinyl-4'-amino]-1,3,5-triazine
2,4-di-n-hexylthio-6-[2',2',6',6'-tetramethylpiperidinyl-4'-amino]-1,3,5-triazine
2,4-dicycloheptylthio-6-[2',2',6',6'-tetramethylpiperidinyl-4'-amino]-1,3,5-triazine
2-chloro-4-amino-6-[2',2',6',6'-tetramethylpiperidinyl-4'-amino]-1,3,5-triazine
2-chloro-4-methylamino-6-[2',2',6',6'-tetramethylpiperidinyl-4'-amino]-1,3,5-triazine
2-chloro-4-ethylamino-6-[2',2',6',6'-tetramethylpiperidinyl-4'-amino]-1,3,5-triazine
2-chloro-4-isopropylamino-6-[2',2',6',6'-tetramethylpiperidinyl-4'-amino]-1,3,5-triazine
2-chloro-4-n-octadecylamino-6-[2',2',6',6'-tetramethylpiperidinyl-4'-amino]-1,3,5-triazine
2-chloro-4-methoxy-6-[2',2',6',6'-tetramethylpiperidinyl-4'-amino]-1,3,5-triazine
2-chloro-4-n-hexyloxy-6-[2',2',6',6'-tetramethylpiperidinyl-4'-amino]-1,3,5-triazine
2-chloro-4-n-eicosyloxy-6-[2',2',6',6'-tetramethylpiperidinyl-4'-amino]-1,3,5-triazine
2-chloro-4-mercapto-6-[2',2',6',6'-tetramethylpiperidinyl-4'-amino]-1,3,5-triazine
2-chloro-4-methylthio-6-[2',2',6',6'-tetramethylpiperidinyl-4'-amino]-1,3,5-triazine
2-chloro-4-n-dodecylthio-6-[2',2',6',6'-tetramethylpiperidinyl-4'-amino]-1,3,5-triazine
2-ethylamino-4,6-bis[1',2',2',6',6'-pentamethylpiperidinyl-4'-amino]-1,3,5-triazine
2-n-octadecylamino-4-6-bis[1',2',2',6',6'-pentamethylpiperidinyl-4'-amino]-1,3,5-triazine
2-n-benzylamino-4,6-bis[1',2',2',6',6'-pentamethylpiperidinyl-4'-amino]-1,3,5-triazine
2-anilino-4,6-bis[1',2',2',6',6'-pentamethylpiperidinyl-4'-amino]-1,3,5-triazine
2-methoxy-4,6-bis[1',2',2',6',6'-pentamethylpiperidinyl-4'-amino]-1,3,5-triazine
2-n-tetradecyloxy-4,6-bis[1',2',2',6',6'-pentamethylpiperidinyl-4'-amino]-1,3,5-triazine
2-methylthio-4,6-bis[1',2',2',6',6'-pentamethylpiperidinyl-4'-amino]-1,3,5-triazine
2-ethylamino-4,6-bis[2',2',6',6'-tetramethylpiperidinyl-4'-ethylenamino]-1,3,5-triazine
2-n-octadecylamino-4,6-bis[2',2',6',6'-tetramethylpiperidinyl-4'-ethylenamino]-1,3,5-triazine
2-n-benzylamino-4,6-bis[2',2',6',6'-tetramethylpiperidinyl-4'-ethylenamino]-1,3,5-triazine
2-anilino-4,6-bis[2',2',6',6'-tetramethylpiperidinyl-4'-ethylenamino]-1,3,5-triazine
2-ethoxy-4,6-bis[2',2',6',6'-tetramethylpiperidinyl-4'-ethylenamino]-1,3,5-triazine
2-n-eicosyloxy-4,6-bis[2',2',6',6'-tetramethylpiperidinyl-4'-ethylenamino]-1,3,5-triazine
2-methylthio-4,6-bis[2',2',6',6'-tetramethylpiperidinyl-4'-ethylenamino]1,3,5-triazine
2-ethylamino-4,6-bis[1'-oxyl-2',2',6',6'-tetramethylpiperidinyl-4'-amino]-1,3,5-triazine
2-n-octadecylamino-4,6-bis[1'-oxyl-2',2',6',6'-tetramethylpiperidinyl-4'-amino]1,3,5-triazine
2-benzylamino-4,6-bis[1'-oxyl-2',2',6',6'-tetramethylpiperidinyl-4'-amino]-1,3,5-triazine
2-ethylamino-4[2',2',6',6'-tetramethylpiperidinyl-4'-amino]-6[2'',2'',6'',6''-tetramethylpiperidinyl-4''-oxy]-1,3,5-triazine 2-anilino-4,6-bis[1'-oxyl-2',2',6',6'-tetramethyl-piperidinyl-4'-amino]-1,3,5-triazine 2-methoxy-4,6-bis[1'-oxyl-2',2',6',6'-tetramethyl-piperidinyl-4'-amino]-1,3,5-triazine 2-methylthio-4,6-bis[1'-oxyl-2',2',6',6'-tetramethyl-piperidinyl-4'-amino]-1,3,5-triazine 2-ethylamino-4,6-bis[2',2',6',6'-tetramethylpiperidinyl-4'-methylenamino]-1,3,5-triazine 2-n-octadecylamino-4,6-bis[2',2',6',6'-tetramethyl-piperidinyl-4'-methylenamino]-1,3,5-triazine 2-benzylamino-4,6-bis[2',2',6',6'-tetramethyl-piperidinyl-4'-methylenamino]-1,3,5-triazine 2-anilino-4,6-bis[2',2',6',6'-tetramethylpiperidinyl-4'-methylenamino]-1,3,5-triazine 2-methoxy-4,6-bis[2',2',6',6'-tetramethylpiperidinyl-4'-methylenamino]-1,3,5-triazine 2-methylthio-4,6-bis[2',2',6',6'-tetramethylpiperidinyl-4'-methylenamino]-1,3,5-triazine The counterparts to the compounds listed above but having oxygen and sulphur bridges in the 4'-position are also to be understood as being examples of specific compounds of formula I Specific examples of compounds of formula IA incluude:

2,4,6-Tris[2',2',6',6'-tetramethyl piperidinyl-4'-oxy]-1,3,5-triazine 2,4,6-Tris[2',2'-dimethyl-6',6'-diethyl piperidinyl-4'-oxy]-1,3,5-triazine 2,4,6-Tris[2',2',6'-trimethyl-6'-ethyl piperidinyl-4'-oxy]-1,3,5-triazine 2,4,6-Tris[2',2'-dimethyl-6',6'-di isopropyl piperidinyl-4'-oxy]-1,3,5-triazine 2,4,6-Tris[2',2'-dimethyl-6',6'-di-n-butyl piperidinyl-4'-oxy]-1,3,5-triazine 2,4,6-Tris[2',2'-dimethyl-6',6'-di-n-dodecyl piperidinyl-4'-oxy]-1,3,5-triazine 2,4,6-Tris[1'-aza-2',2'-dimethyl spiro [5,5]-undecane-4'-oxy]-1,3,5-triazine 2,4,6-Tris[2',2',6',6'-tetra methyl piperidinyl-4'-amino]-1,3,5-triazine 2,4,6-Tris[2',2'-dimethyl-6',6'-diethyl piperidinyl-4'-amino]-1,3,5-triazine 2,4,6-Tris[1'-aza-2',2'-dimethyl spiro-[5,5]-undecane-4'-amino]-1,3,5-triazine 2,4,6-Tris[2',2',6',6'-tetramethyl piperidinyl-4'-thio]-1,3,5-triazine 2,4,6-Tris[1',2',2'6',6'-pentamethyl piperidinyl -4'-oxy]-1,3,5-triazine 2,4,6-Tris[1'-ethyl-2',2',6',6'-tetramethyl piperidinyl-4'-thio]-1,3,5-triazine 2,4,6-Tris[1'-n-propyl-2',2',6',6'-tetramethyl piperidinyl-4'-amino]-1,3,5-triazine 2,4,6-Tris[1'-benzyl-2',2',6',6'-tetramethyl piperidinyl-4'-oxy]-1,3,5-triazine 2,4,6-Tris[1'-allyl-2',2',6',6'-tetramethylpiperidinyl-4'-oxy]-1,3,5-triazine 2,4,6-Tris[1',2',2',6',6'-pentamethylpiperidinyl-4'-amino]-1,3,5-triazine 2,4,6-Tris[1'-allyl-2',2',6',6'-tetra methyl piperidinyl-4'-amino]-1,3,5-triazine 2,4,6-Tris[1'-benzyl-2',2',6',6'-tetra methyl piperidinyl-4'-thio]-1,3,5-triazine 2,4,6-Tris[1'-oxyl-2',2',6',6'-tetra methyl piperidinyl-4-oxy]-1,3,5-triazine 2,4,6-Tris[1'-oxyl-2',2',6',6'-tetra methyl piperidinyl-4'-amino]-1,3,5-triazine 2,4-Bis[2",2",6",6"-tetra methyl piperidinyl-4"-oxy]-6-[1',2',2',6',6'-penta-methyl piperidinyl-4'-oxy]-1,3,5-triazine 2,4-Bis[2',2',6',6'-tetra methyl piperidinyl-4'-oxy]-6-[2",2",6",6"-tetra methyl piperidinyl-4"-amino]-1,3,5-triazine 2,4-Bis[2',2',6',6'-tetra methyl piperidinyl-4'-amino]-6-[2",2",6",6"-tetra methyl piperidinyl-4"-oxy]-1,3,5-triazine 2,4,6-Tris[2',2',6',6'-tetra methyl piperidinyl-4'-methyl enoxy]-1,3,5-triazine 2,4,6-Tris[1',2',2',6',6'-penta methyl piperidinyl-4'-methylenoxy]-1,3,5-triazine 2,4,6-Tris[2',2',6',6'-tetra methyl piperidinyl-4'-methylene amino]-1,3,5-triazine 2,4,6-Tris[1',2',2',6',6'-pentamethyl piperidinyl-4'-methylen amino]1,3,5-triazine 2,4,6-Tris[2',2',6',6'-tetra methyl piperidinyl-4'-methylen thio]-1,3,5-triazine 2,4-Bis[2',2',6',6'-tetra methyl piperidinyl-4'-oxy]-6-[2",2",6",6"-tetra methyl piperidinyl-4"-methylenoxy]-1,3,5-triazine 2,4-Bis[1',2',2',6',6'-penta methyl piperidinyl-4'-oxy]-6-[2",2",6",6"-tetramethyl piperidinyl-4"-methylenamino]-1,3,5-triazine 2,4,6-Tris[2',2',6',6',-tetra methyl piperidinyl-4'-ethylenoxy]-1,3,5-triazine 2,4,6-Tris[1',2',2',6',6'-penta methyl piperidinyl-4'-ethylenoxy]-1,3,5-triazine 2,4,6-Tris[2',2'6',6'-tetra methyl piperidinyl-4'-ethylenamino]-1,3,5-triazine 2,4,6-Tris[1',2',2',6',6'-penta methyl piperidinyl-4'-ethylenamino]-1,3,5-triazine 2,4,6-Tris[2',2',6',6'-tetramethyl piperidinyl-4'-ethylenthio]-1,3,5-triazine 2,4-Bis[2',2',6',6'-tetramethyl piperidinyl-4'-amino]-6-[2",2",6",6"-tetramethyl piperidinyl-4"-ethylenamino]-1,3,5-triazine 2,4-Bis[1',2',2',6',6'-pentamethyl piperidinyl-4'-oxy]-6-[2",2"6",6"-tetramethyl piperidinyl-4"-ethylenoxy]-1,3,5-triazine 2,4-Bis[2',2',6',6'-tetramethyl piperidinyl-4'-methylenoxy]-6-[2",2",6",6"-tetramethyl piperidinyl-4"-ethylenamino]-1,3,5-triazine 2-Chloro-4,6-di(2',2',6',6'-tetramethyl piperidinyl-4'-oxy)-1,3,5-triazine 2-Chloro-4,6-di(2',2',6',6'-tetramethyl piperidinyl-4'-amino)-1,3,5-triazine 2-Chloro-4,6-di(1'-oxyl-2',2',6',6'-tetramethyl piperidinyl-4'-oxy)-1,3,5-triazine 2-Chloro-4,6-di(2',2',6',6'-tetramethyl piperidinyl-4'-thio)-1,3,5-trizine 2-Chloro-4,6-di(2',2',6',6'-tetramethyl piperidinyl-4'-methylenoxy)-1,3,5-triazine 2-Chloro-4,6-di(1'-allyl-2',2',6',6'-tetramethyl piperidinyl-4'-oxy)-1,3,5-triazine 2-Chloro-4,6-di(2',2',6',6'-tetramethyl piperidinyl-4'-methylenamino)-1,3,5-triazine 2-Chloro-4,6-di(2',2',6',6'-tetramethyl piperidinyl-4'-ethylenoxy)-1,3,5-triazine 2-Chloro-4,6-di(2',2',6',6'-tetramethyl piperidinyl-4'-ethylenamino)-1,3,5-triazine 2-Chloro-4-(2',2',6',6'-tetramethyl piperidinyl-4'-oxy)-6-(2",2",6",6"-tetramethyl piperidinyl-4"-amino)-1,3,5-triazine 2,4-Dichloro-6-(2',2',6',6'-tetramethyl piperidinyl-4'-oxy)-1,3,5-triazine 2,4-Dichloro-6-(2',2',6',6'-tetramethyl piperidinyl-4'-amino)-1,3,5-triazine 2,4-Dichloro-6-(2',2',6',6'-tetramethyl piperidinyl-4'-thio)-1,3,5-triazine 2,4-Dichloro-6-(1',2',2',6',6'-pentamentyl piperidinyl-4'-oxy)-1,3,5-triazine 2,4-Dichloro-6-(1'oxyl-2',2',6',6'-tetramethyl piperidinyl-4'-oxy)-1,3,5-triazine 2,4-Dichloro-6-(2',2',6',6'-tetramethyl piperidinyl-4'-ethylenoxy)-1,3,5-triazine 2,4-Dichloro-6-(2',2',6',6'-tetramethyl piperidinyl-4'-ethylenamino)-1,3,5-triazine 2,4-Dichloro-6-(2'2',6',6'-tetra methyl piperidinyl-4'-methylenoxy)-1,3,5-triazine 2,4-Dichloro-6-(2',2',6',6'-tetra methyl piperidinyl-4'-methylen amino)-1,3,5-triazine 2,4,6-Tris[1'-β-hydroxyethyl-2',2',6',6'-tetramethyl-piperidinyl-4'-oxy]-1,3,5-triazine 2,4,6-Tris[1'-β-hydroxyethyl-2',2',6',6'-tetramethyl-piperidinyl-4'-amino]-1,3,5-triazine 2,4,6-Tris[1'-β-hydroxuethyl-2',2',6',6'-tetramethyl-piperidinyl-4'-ethyleneamino]-1,3,5-triazine 2,4,6-Tris[1'-β-hydroxypropyl-2',2',6',6'-tetramethylpiperidinyl-4'-oxy]-1,3,5-triazine 2,4,6-Tris[1'-β-hydroxypropyl-2',2',6',6'-tetramethylpiperidinyl-4'-amino]-1,3,5-triazine 2,4,6-Tris[1'-β-hydroxy-β-phenylethyl-2',2',6',6'-tetramethylpiperidinyl-4'-oxy]-1,3,5-triazine 2,4,6-Tris[1'-β-hydroxy-β-phenylethyl-2',2',6',6'-tetramethylpiperidinyl-4'-amino]-1,3,5-triazine as well as the sulphate, chloride, oxalate and acetate salts of the preceding compounds IA.

Specific examples of compounds of formula IB include:

2,4,6-tris[2',2',6',6'-tetramethylpiperidinyl-4'-oxy]-1,3,5-triazine 2,4,6-tris[2',2'-dimethyl-6',6'-diethylpiperidinyl-4'-oxy]-1,3,5-triazine 2,4,6-tris[2',2',6'-trimethyl-6'-ethylpiperidinyl-4'-oxy]-1,3,5-triazine 2,4,6-tris[2',2'-dimethyl-6',6'-diisopropylpiperidinyl-4'-oxy]-1,3,5-triazine 2,4,6-tris[2',2'-dimethyl-6',6'-di-n-dodecylpiperidinyl-4'-oxy]-1,3,5-triazine 2,4,6-tris[1'-aza-2',2'-dimethyl spiro-[5,5]-undecane-4'-oxy]-1,3,5-triazine 2,4-bis[2',2',6',6'-tetramethylpiperidinyl-4'-oxy]-6-[1'''-aza-2''',2'''-dimethylspiro[5,5]-undecane-4'''-oxy]-1,3,5-triazine 2-[2',2',6',6'-tetramethylpiperidinyl-4'-oxy]-4-[2''',2'''-dimethyl-6'',6''-diisopropylpiperidinyl-4''-oxy]-6-[1''''-aza-2'''',2''''-dimethylspiro[5,5]-undecane-4''''-oxy]-1,3,5-triazine 2,4,6-tris[1',2',2',6',6'-pentamethylpiperidinyl-4'-oxy]-1,3,5-triazine 2,4,6-tris[1'-ethyl-2',2',6',6'-tetramethylpiperidinyl-4'-oxy]-1,3,5-triazine 2,4,6-tris[1'-n-butyl-2',2',6',6'-tetramethylpiperidinyl-4'-oxy]-1,3,5-triazine 2,4,6-tris[1'-n-dodecyl-2',2',6',6'-tetramethylpiperidinyl-4'-oxy]-1,3,5-triazine 2,4,6-tris[1'-allyl-2',2',6',6'-tetramethylpiperidinyl-4'-oxy]-1,3,5-triazine 2,4,6-tris[1'-benzyl-2',2',6',6'-tetramethylpiperidinyl-4'-oxy]-1,3,5-triazine 2,4,6-tris[1',2',2'-trimethyl-6',6'-di-n-butylpiperidinyl-4'-oxy]-1,3,5-triazine 2,4,6-tris[1'-allyl -2',2'-dimethyl-6',6'-di-n-dodecyl-piperidinyl-4'-oxy]-1,3,5-triazine 2,4,6-tris[1'-aza-1'-benzyl-2',2'-dimethylspiro-[5,5]-undecane-4'-oxy]-1,3,5-triazine 2,4-bis[2',2',6',6'-tetramethylpiperidinyl-4'-oxy]-6-[1'',2'',2'',6'',6''-pentamethyl piperidinyl-4''-oxy]1,3,5-triazine 2-[2',2',6',6'-tetramethylpiperidinyl-4'-oxy]-4,6-bis[1'',2'',2'',6'',6''-pentamethyl piperidinyl-4''-oxy]-1,3,5-triazine.

The present invention also provides a first process for the production of a compound of formula I comprising reacting a halogenated 1,3,5-triazine or a halogenated pyrimidine preferably a cyanuric halide, especially cyanuric chloride, with the compound having the formula:

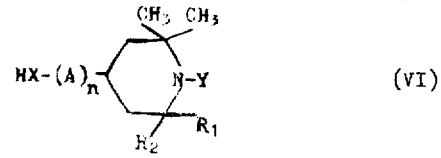

(VI)

In formula I wherein U is —N— and wherein Z'' and Z''' are piperidine residues, the compounds of formula I may be symmetrical or unsymmetrical, depending upon the nature of the substituents in the formula VI. For the preparation of symmetrical compounds of formula I, it is convenient to use at least three molecular proportions of the compound of formula VI per molecular proportion of cyanuric halide, preferably cyanuric chloride.

In order to produce an unsymmetrical compound of formula I, dissimilar compounds of formula VI may be added stepwise by introducing one or two residues into the triazine molecule at one time. In this way, two or three different piperidinyl residues may be introduced into the triazine nucleus.

For the preparation of compounds having two identical piperidine residues, the reaction is carried out using at least two molecular proportions of a single compound VI per molecular proportion of cyanuric halide. It is convenient to carry out the reaction in the presence of a halogen acid binding agent and optionally in the presence of a solvent inert under the reaction conditions. Suitable examples of halogen acid binding agents include organic bases such as triethylamine, inorganic bases such as sodium hydroxide or sodium carbonate; alternatively an excess amount of the amine reactant of formula VI may be employed as the halogen binding agent. If a solvent is used suitable examples of such solvents are toluene and xylene.

In the particular case of compounds of formula VI wherein X is —O—, the alkali metal salt of the compound may be first prepared, for instance, by reacting the compound with an alkali metal, prior to reaction with the cyanuric halide.

When Z'' and Z''' are not both piperidine residues, reaction of the remaining halogen can be accomplished by treating the derived compound with an amine of formula:

VII or the derived strong acid salt an alcohol of formula:

 VIII or a thio compound of formula:

 IX

The reaction is conveniently carried out in the presence of a suitable halogen acid binding agent as described above. In the particular case of the amine VII an excess amount of this reactant may be employed. In the particular case of the alcohol VIII the alkali metal salt may first be prepared prior to reaction.

Alternatively these compounds containing two piperidine residues can be prepared by reacting a cyanuric halide firstly with one molecular proportion of the compounds VII, VIII and IX and then by treating the derived dihalogenated material with the piperidine compound VI using the conditions described above.

For compounds containing only one piperidine residue, one molecular proportion of compound VI may be added, usually at low temperature, to the cyanuric halide using the conditions described above. The derived dihalogenated material can then be treated with one or two molecular proportions of VII, VIII or IX as desired.

Alternatively one or two molecular proportions of the compounds VII, VIII or IX may be added to one molecular proportions of a cyanuric halide to yield the di- or mono- halogenated product which can then be reacted with one molecular proportion of piperidine compound VI.

The present invention also provides a second process for producing a compound of formula I wherein Y is other than hydrogen, comprising reacting the corresponding compound of formula I wherein Y is hydrogen with a compound capable of replacing the hydrogen at the nitrogen atom by the group Y.

For example, the nitrogen substitution reactions may be effected using an alkylating, alkenylating, alkynylating or aralkylating agent such as alkyl, alkenyl, alkynyl or aralkyl halide.

Alternatively, the nitrogen substitution reactions may be carried out by a Leuckart or Wallach reaction using formic acid and the appropriate aldehyde or ketone. For example, the corresponding NH compound may be reacted with formic acid and formaldehyde to produce the N-methyl compound.

To produce a compound of formula I wherein one or more of the substituents Y is a hydroxyalkyl group, the corresponding compound of formula I wherein Y is hydrogen, may be reacted with the appropriate alkylene oxide such as ethylene oxide, propylene oxide or styrene oxide.

To produce a compound of formula I wherein one or more of Y is O, the corresponding compound of formula I wherein the corresponding Y substituent is hydrogen may be oxidised with a peroxide, such as hydrogen peroxide, optionally in the presence of pertungstic acid, or with a per-acid such as performic or peracetic acid. In a modification of this oxidation reaction, the starting-material may be the corresponding N-lower alkyl compound rather than the NH compound of formula I.

Although in theory this method may be used to produce compounds of formula I in which only one of Y is O, in practice it is very much preferred to conduct the oxidation so that all of Y are O; otherwise complex mixtures are obtained from which it is difficult to isolate partial N-oxyls of formula I.

It is to be understood that the above processes can also be used to produce the less preferred compounds of formula I wherein U is —CH—. The compounds of formula I have been found to be excellent light stabilisers for organic material, especially polymers. Accordingly, the present invention also provides a composition comprising an organic material and, as stabiliser, a minor proportion of a compound of formula I as hereinbefore defined.

Compounds of formula I have been found to impart to polyolefines an exceptionally high degree of stability towards deterioration normally induced by the effects of ultra-violet radiation or exposure to heat. Moreover, this improved stability is achieved without affecting the colour properties of the treated polyolefine. The stabilisers of the invention provide effective light and/or heat stabilisation, especially for low- and high-density polyethylene and polypropylene and polystyrene as well as polymers of butene-1, pentene-1, 3-methylbutene-1, hexene-1, 4-methylpentene-1, 4-methylhexene-1 and 4,4-dimethyl-pentene-1, and also co- and terpolymers of olefines, particularly of ethylene or propylene.

Other organic materials susceptible to degradation by the effects of light and the properties of which are improved by the incorporation therein of a compound of Formula I include natural and synthetic polymeric materials, for instance natural and synthetic rubbers the latter including, for example, homo-, co- and terpolymers of acrylonitrile, butadiene and styrene.

Specific synthetic polymers include polyvinyl chloride, polyvinylidene chloride and vinyl chloride copolymers, polyvinyl acetate as well as condensation polymers derived from ether, eseter (derived from carboxylic sulphonic or carbonic acids), amide or urethane groupings. These polymers can, for instance form the basis of surface coating media such as paints and lacquers having an oil or resin, for instance an alkyd or polyamide resin base.

The amount of the compound of formula I which is incorporated into the organic material in order to achieve maximal protection against degradation by light varies according to the properties of the organic material treated and according to the severity of the light radiation and to the length of exposure. However for most purposes it is sufficient to use an amount of the compound of formula I within the range of from 0.01 to 5% by weight, more preferably within the range of from 0.1 to 2% by weight based on the weight of untreated organic material.

The compounds of formula I may be incorporated into the polymeric material by any of the known techniques for compounding additives with a polymer. For example, the compound of formula I and the polymer may be compounded in an internal mixer. Alternatively, the compound of formula may be added as a solution or slurry in a suitable solvent or dispersant, for instance an inert organic solvent such as methanol, ethanol or acetone to powdered polymer and the whole mixed intimately in a mixer, and the solvent subsequently removed. As a further alternative the compound of formula I may be added to the polymer during the preparation of the latter, for instance at the late stage of polymer production, to provide pre-stabilised polymer material.

Optionally, the composition of the invention may contain one or more further additives, especially those used in polymer formulations, such as antioxidants of the phenol or amine type, U.V. absorbers and light protectants, phosphite stabilisers, peroxide decomposer polyamide stabilisers, basic co-stabilisers, polyvinyl chloride stabilisers, nucleation agents, plasticizers, lubricants, emulsifiers, anti-static agents, flame-protectants, pigments, carbon black asbestos, glass fibres, kaolin and talc.

The present invention therefore includes binary, tertiary and multi-component decompositions containing the stabiliser of formula I together with one or more functional additives for polymers.

Examples of suitable antioxidants are those of the hindered phenol type such as those selected from the following groups:

1. Phenolic compounds having the general formula

wherein
Q is

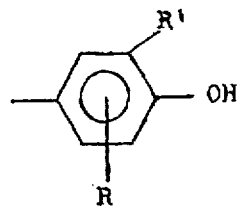

A₁ is - CR(COOR'')₂

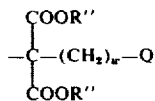

R is hydrogen or lower alkyl
R' is lower alkyl
R'' is alkyl group having from 6 – 24 carbon atoms
W is an integer from 0 to 4

Illustrative examples of the compounds shown above are:
di-n-octadecyl α- (3,5-di-t-butyl-4-hydroxy-benzyl) malonate
di-n-octadecyl α-(3-t-butyl-4-hydroxy-5-methylbenzyl) malonate
di-n-octadecyl-α,α'bis-(3-t-butyl-4-hydroxy-5-methylbenzyl)malonate 2. Phenolic compounds having the general formula

Q—R'''

Illustrative examples of the compounds shown above are
2,6-di-t-butyl-p-cresol
2-methyl-4,6-di-t-butylphenol and the like
2,6-di-octadecyl-p-cresol 3. Phenolic compounds having the formula:

Q—C_wH_{2w}—Q

Illustrative examples of the compounds shown are:
2,2'-methylene-bis(6-t-butyl-4-methylphenol)
2,2'-methylene-bis(6-t-butyl-4-ethylphenol)
4,4'-butylidene-bis(2,6-di-t-butylphenol)
4,4'-(2-butylidene)-bis(2-t-butyl-5-methylphenol)
2,2'-methylene-bis[6-(2-t-methylcyclohexyl)-4-methylphenol]
2,2'-methylene-bis(3-t-butyl-5-ethylphenol)
4,4'-methylene-bis(3,5-di-t-butylphenol)
4,4-methylene-bis(3-t-butyl-5-methylphenol)
2,2'-methylene-bis(3-t-butyl-5-methylphenol) and the like.

4. Phenolic compounds having the formula:

R'''—O—Q

Illustrative examples of such compounds are:
2,5-di-t-butylhydroquinone
2,6-di-t-butylhydroquinone
2,5-di-t-butyl-4-hydroxyanisole 5. Phenolic compounds having the formula:

Q—S—Q.

Illustrative examples of such compounds are:
4,4'-thiobis-(2-t-butyl-5-methylphenol)
4,4'-thiobis-(2-t-butyl-6-methylphenol)
2,2-thiobis-(6-t-butyl-4-methylphenol)
4,4'-thiobis-(2-methyl-5-t-butylphenol)

6. Phenolic compounds having the formula

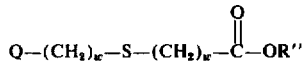

Illustrative examples of such compounds are: octadecyl-(3,5-dimethyl-4-hydroxybenzylthio)-acetate dodecyl-(3,5-di-t-butyl-4-hydroxybenzylthio)-propionate 7. Phenolic compounds having the formula

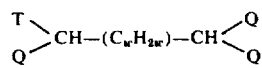

wherein T is hydrogen
R or Q as defined above.
Illustrative examples of such compounds are:
1,1,3-tris(3,5-dimethyl-4-hydroxyphenyl)-propane
1,1,3-tris(5-t-butyl-4-hydroxy-2-methylphenyl)-butane
1,1,5,5-tetrakis-(3'-t-butyl-4'-hydroxy-6'-methylphenyl)-n-pentane 8. Phenolic compounds having the formula:

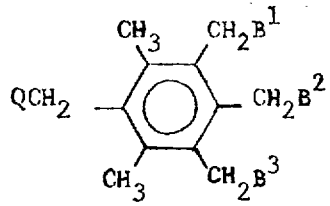

wherein B¹, B² and B³ are hydrogen, methyl or Q, provided that when B¹ and B³ are Q then B² is hydrogen or methyl and when B² is Q then B¹ and B³ are hydrogen or methyl.

Illustrative examples of such compounds are:
1,4-di(3,5-di-t-butyl-4-hydroxybenzyl)-2,3,5,6-tetramethylbenzene
1,3,5-tri(3,5-di-t-butyl-4-hydroxybenzyl)-2,4,6-trimethylbenzene 9. Phenolic compounds having the formula

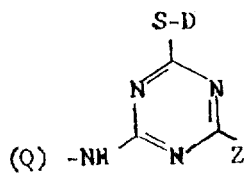

wherein Z is NHQ, —S—D— or —O—Q
D is alkyl group having from 6 - 12 carbon atoms or —(C_wH_{2w})—S—R''

Illustrative examples of such compounds are:
2,4-bis-(n-octylthio)-6-(3,5-di-t-butyl-4-hydroxyanilino)-1,3,5-triazine
6-(4-hydroxy-3-methyl-5-t-butylanilino)-2,4-bis-(n-octyl-thio)-1,3,5-triazine 6-(4-hydroxy-3,5-dimethylanilino)-2,4-bis-(n-octylthio)-1,3,5-triazine
6-(4-hydroxy-3,5-di-t-butylanilino)-2,4-bis-(n-octylthio)-1,3,5-triazine
6-(4-hydroxy-3,5-di-t-butylanilino)-4-(4-hydroxy-3,5-di-t-butylphenoxy)-2-(n-octylthio)1,3,5-triazine
2,4-bis(4-hydroxy-3,5-di-t-butlanilino)-6-(n-octylthio)-1,3,5-triazine 10. Phenolic compounds having the formula:

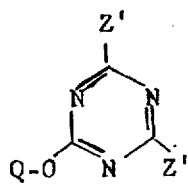

wherein Z' is —O—Q, —S—D or —S—($C_wH_{2-w}$)—SD.

Illustrative examples of such compounds are:
2,3-bis-(3,5-di-t-butyl-4-hydroxyphenoxy)-6-(n-octylthio-1,3,5-triazine
2,4,6-tris-(4-hydroxy-3,5-di-t-butylphenoxy)-1,3,5-triazine
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxyl)-2,4-bis-(n-octylthiopropylthio)-1,3,5-triazine
6-(4-hydroxy-3,5-di-t-butylphenoxy)-2,4-bis-(n-dodecyl-thioethylthio)-1,3,5-triazine
2,4-bis-(4-hydroxy-3,5-di-t-butylphenoxy)-6-butylthio-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine
2,4-bis-(4-hydroxy-3,5-di-t-butylphenoxy)-6-(n-dodecylthioethylthio)-1,3,5-triazine.

11. Phenolic compounds having the formula

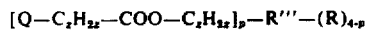

wherein p is an integer from 2 to 4 and R''' is a tetravalent radical selected from aliphatic hydrocarbons having from 1 to 30 carbon atoms, aliphatic mono- and dithioethers having from 1 to 30 carbon atoms, aliphatic mono- and diethers having from 1 to 30 carbon atoms and z is an integer from 0 to 6.

Illustrative examples of such compounds are

SUB-CLASS I n-Octadecyl-3-(3,5-di-t-butyl-4-hydroxyphenyl)-propionate
n-Octadecyl-2-(3,5-di-t-butyl-4-hydroxyphenyl)-acetate
n-Octadecyl-3,5-di-t-butyl-4-hydroxybenzoate
n-Hexyl-3,5-di-t-butyl-4-hydroxyphenylbenzoate
n-Dodecyl-3,5-di-t-butyl-4-hydroxyphenylbenzoate
Neo-dodecyl-3-(3,5-di-t-butyl-4-hydroxyphenyl)-propionate
Dodecyl-β-(3,5-di-t-butyl-4-hydroxyphenyl)-propionate
Ethyl-α-(4-hydroxy-3,5-di-t-butylphenyl)-isobutyrate
Octadecyl-α-(4-hydroxy-3,5-di-t-butylphenyl)-isobutyrate
Octadecyl-α-(4-hydroxy-3,5-di-t-butylphenyl)-propionate

SUB-CLASS II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxybenzoate
2-(2-hydroxyethylthio)ethyl 3,5-di-t-butyl-4-hydroxybenzoate
2,2'-Thiodiethanol bis(3,5-di-t-butyl-4-hydroxyphenyl) acetate
Diethyl glycol bis-[3,5-di-t-butyl-4-hydroxyphenyl) propionate]
2-(n-octadecylthio)ethyl 3-(3,5-di-t-butyl-4-hydroxyphenyl)propionate
2,2'-Thiodiethanol-bis-3-(3,5-di-t-butyl-4-hydroxyphenyl)propionate
Stearamido N,N-bis-[ethylene 3-(3,5-di-t-butyl-4-hydroxyphenyl)propionate]
n-Butylimino N,N-bis-[ethylene 3-(3,5-di-t-butyl-4-hydroxyphenyl)propionate]
2-(2-stearoyloxyethylthio)ethyl 3,5-di-t-butyl-4-hydroxybenzoate
2-(2-hydroxyethylthio)ethyl 7-(3-methyl-5-t-butyl-4-hydroxyphenyl)heptanoate
2-(2-stearoyloxyethylthio)ethyl 7-(3-methyl-5-t-butyl-4-hydroxyphenyl)heptanoate

SUB-CLASS III 1,2-propylene glycol bis-[3-(3,5-di-t-butyl-4-hydroxyphenyl)propionate]
Ethylene glycol bis-[3-(3,5-di-t-butyl-4-hydroxyphenyl) propionate]
Neopentylglycol bis-[3-(3,5-di-t-butyl-4-hydroxyphenyl) propionate]
Ethylene glycol bis-(3,5-di-t-butyl-4-hydroxyphenylacetate)
Glycerine-1-n-octadecanoate-2,3-bis-(3,5-di-t-butyl-4-hydroxyphenylacetate
Pentaethylthritol-tetrakis-[3-(3,5-di-t-butyl-4-hydroxyphenyl)propionate]
1,1,1-trimethylol ethane-tris-3-(3,5-di-t-butyl-4-hydroxyphenyl)propionate
Sorbitol hexa-[3-(3,5-di-t-butyl-4-hydroxphenyl) propionate]
1,2,3-butanetriol tris-[3-(3,5-di-t-butyl-4-hydroxyphenyl)propionate]
2-hydroxyethyl 7-(3-methyl-5-t-butyl-4-hydroxyphenyl) heptanoate
2-stearoyloxyethyl 7-(3-methyl-5-t-butyl-4-hydroxyphenyl)heptanoate 1,6-n-hexanediol-bis[(3',5'-di-t-butyl-4-hydroxyphenyl) propionate]

12. Phenolic compounds having the formula $$Q-(CH_2)_x-\underset{\underset{OR''}{|}}{\overset{\overset{O}{\|}}{P}}-OR''$$

where $x$ is an integer of 1 or 2.

Illustrative examples of such compounds are

Di-n-octadecyl 3,5-di-t-butyl-4-hydroxybenzyl-phosphonate

Di-n-octadecyl 3-t-butyl-4-hydroxy-5-methylbenzyl-phosphonate

Di-n-octadecyl 1-(3,5-di-t-butyl-4-hydroxyphenyl)ethanephosphonate

Di-n-tetradecyl 3,5-di-t-butyl-4-hydroxybenzylphosphonate

Di-n-hexydecyl 3,5-di-t-butyl-4-hydroxybenzylphosphonate

Di-n-docosyl-3,5-di-t-butyl-4-hydroxybenzylphosphonate

Di-n-octadecyl 3,5-di-t-butyl-4-hydroxybenzylphosphonate.

13. Phenolic compounds having the formula wherein W and Q are defined above.

Illustrative examples of such compounds are:

tris-(3,5-di-t-butyl-4-hydroxybenzyl)isocyanurate tris-(3-t-butyl-4-hydroxy-5-methylbenzyl)isocyanurate. The above phenolic hydrocarbon stabilizers are known and many are commercially available.

While any of the above mentioned antioxidants can be useful in combination with the ultraviolet light stabilizers of this invention, the preferred antioxidants consist of the hindered phenols in groups 1, 8, 9, 10, 11, 12 and 13 as mentioned above. The most preferred hindered phenols are those of groups 1, 9, 11, 12 and 13.

Further examples of antioxidants are those of the aminoaryl series for instance aniline and naphthylamine derivatives as well as their heterocyclic derivatives such as:

phenyl-1-naphthylamine
phenyl-2-naphthylamine
N,N'-diphenyl-p-phenyldiamine
N,N'-di-sec.butyl-p-phenylenediamine
6-Ethoxy-2,2,4-trimethyl-1,2-dihydroquinoline
6-Dodecyl-2,2,4-trimethyl-1,2-dihydroquinoline
Mono- and di-octyliminodibenzyl and
polymerised 2,2,4-trimethyl-1,2-dihydroquinoline.

Ultraviolet absorbers and light protectants include a. 2-(2'-hydroxyphenyl)benzotriazoles, for instance 5'-methyl; 3',5'-di-t-butyl; 5'-t-butyl; 5-chloro-3',5'-di-t-butyl; 5-chloro-3'-t-butyl-5'-methyl; 3'-sec. butyl-5'-tert.butyl; 3'-[α-methylbenzyl]-5'-methyl-; 3'-[α-methylbenzyl)-5'-methyl-5-chloro-; 4'-octoxy-; 3',5'-di-t-amyl; 3'-methyl-5'-carbamethoxyethyl; 5-chloro-3',5'-di-t-amyl derivatives.

b. 2,4-bis-(2'-hydroxyphenyl)-6-alkyl-S-triazines, for instance the 6-ethyl or 6-undecyl derivatives.

c. 2-hydroxybenzophenones, for instance the 4-hydroxy, 4-methoxy, 4-octoxy-, 4-decyloxy-, 4-dodecyloxy-, 4,2', 4'-trihydroxy or 2'-hydroxy-4,4'-dimethoxy derivatives.

d. 1,3-Bis(2'-hydroxybenzoyl)-benzenes for instance, 1,3-bis-(2'-hydroxy-4'-hexyloxybenzoyl)benzene 1,3-bis-(2'-hydroxy-4'-octoxybenzoyl)benzene 1,3-bis-(2'-hydroxy-4'-dodecyloxybenzoyl)benzene e. Aryl esters from optionally substituted benzoic acids such as phenylsalicylate, octylphenylsalicylate, dibenzoyl resorcinol, bis-(4-tert.butylbenzoyl) resorcinol, benzoylresorcinol and 3,5-di-tert.butyl-4-hydroxybenzoic acid-2,4-di-tert.butyl phenyl ester and -octadecyl ester and -2-methyl-4,6-di-tert.butyl phenyl ester.

f. Acrylates, for instance αCyano-β,β-diphenylacrylic acid ethyl- or iso-octyl ester, α-carbomethoxy-cinnamic acid, methyl- or butyl ester and N-(β-carbomethoxyvinyl)-2-methyl indoline.

g. Nickel compounds such as nickel complexes of 2,2'-thio-bis-(4-tert.octylphenol), for instance the 1:1 and 1:2 complexes, optionally having other ligands such as n-butylamine, triethanolamine or N-cyclohexyl-diethanolamine; nickel complexes of bis-(4-tert.octylphenyl) sulphone such as the 2:1 complex, optionally having other ligands such as 2-ethylcarproic acid; nickel dibutyl dithiocarbamates; nickel salts of 4-hydroxy-3,5-di-tert. butylbenzyl-phosphonic acid mono-alkyl esters such as the methyl-, ethyl- or butyl esters; the nickel complex of 2-hydroxy-4-methyl-phenyl-undecylketonoxime; and nickel-3,5-di-tert.butyl-4-hydroxy benzoate, and h. Oxalic acid diamides, for instance
4,4'-dioctyloxyoxanilide
2,2'-dioctyloxy-5,5'-di-tert.butyl-oxanilide
2,2'-di-dodecyloxy-5,5'-di-tert.butyl oxanilide
2-ethoxy-5-tertiarybutyl-2'-ethyl-oxanilide
2-ethoxy-2'-ethyl-oxanilide mixtures of o- and p-methoxy and ethoxy-di-substituted oxanilides and the compound of formula:

$$CH_3{\underset{CH_3}{\overset{CH_3}{>}}}N-(CH_2)_3-NHCOCONH(CH_2)_3N{\underset{CH_3}{\overset{CH_3}{<}}}$$

Phosphite stabilisers include triphenyl phosphite, diphenylalkyl phosphites, phenyl dialkyl phosphites, trinonylphenyl phosphite, trilauryl phosphite, trioctadecyl phosphite, 3,9-di-isodecyloxy-2,4,8,10-tetraoxa- 3,9-diphosphaspiro-(5,5)-undecane and tri-(4-hydroxy-3,5-di-tert.butylphenyl)phosphite.

Peroxide-decomposing compounds for polyolefins include esters of β-thiodipropionic acids, for instance the lauryl-, stearyl-, myristyl- or tridecyl esters, salts of mercaptobenzimidazoles such as the zinc salt and diphenylthiourea.

Suitable polyamide stabilisers include copper salts in combination with iodides and/or further phosphorus compounds and salts of bivalent manganese.

Basic co-stabilisers are, for example, polyvinylpyrrolidone, melamine, benzoguanamine, triallyl cyanurate, dicyandiamide, urea derivatives, hydrazine derivatives, amines, polyamides, polyurethanes, alkali and alkaline earth salts of higher saturated or unsaturated fatty acids such as calcium stearate.

Polyvinyl chloride stabilizers include organotin compounds, organo lead compounds and Ba/Cd salts of fatty acids.

Examples of nucleation agents are 4-tert.butyl benzoic acid, adipic acid and diphenylacetic acid.

As with the compound of formula I, any further additive is advantageously employed in a proportion within the range of from 0.01 to 5% by weight, based on the weight of untreated polymeric material.

In binary combinations with one or more antioxidants listed above or in tertiary combinations with such antioxidants and U.V. absorbers listed above, the compounds of formula I provide very effective stabilizer packages in polyolefine formulations.

The halo-compounds of formula I, in addition to their property of functioning as a stabiliser for organic material, may also find use as intermediates for materials such as other stabilisers.

Some Examples will now be given. Parts and percentages are by weight unless otherwise stated.

EXAMPLE 1

To 28.2 parts of 2,2,6,6-tetramethylpiperidin-4-ol in 200 parts of dry xylene were added in portions 4.2 parts of sodium. This mixture was heated at reflux for 18 hours and then cooled. 10.1 parts of cyanuric chloride were added in portions and the mixture brought to a reflux temperature for 1 hour. Evaporation to dryness under reduced pressure was followed by extraction with petroleum ether (b.p. 60°–80°C.) using a Soxhlet extractor apparatus. Evaporation vacuo gave the desired product contaminated with 2,2,6,6-tetramethylpiperidin-4-ol. Sublimation in vacuo removed this contaminant and the residual colourless solid was crystallised from petroleum ether (b.p. 60°–80°C.) to yield 23.7 parts of 2,4,6-tris[2',2',6',6'-tetramethylpiperidinyl-4'-oxy]-1,3,5-triazine of melting point 198°–200°C. This material gave the following elemental analysis by weight:

| | Required for $C_{30}H_{54}N_6O_3$ | Found |
|---|---|---|
| Carbon | 65.90% | 65.72% |
| Hydrogen | 9.95% | 9.85% |
| Nitrogen | 15.37% | 15.19% |

EXAMPLE 2

38 parts of polypropylene were homogenised with 0.76 part of n-octadecyl-β-(4'-hydroxy-3',5'-di-t-butylphenyl) propionate in a kneading machine over a period of 3 minutes. 0.19 part of the product of Example 1 was then added and homogenisation continued for another 7 minutes.

The homogenised mixture was removed from the kneader and pressed to a thickness of from 2 to 3 mm. in a press.

9 parts of the polypropylene mixture were then charged into a second press in which the press-plates were protected by aluminum foil having a thickness of 0.1 mm. The press was closed and, for 2 minutes, no pressure was applied. The pressure was then increased up to a maximum of 12 tons and this pressure held for 6 minutes, the temperature of the press being 260°C. The pressure was released and the material (0.3 mm thick) was cooled under running water.

This material was cut into from 3 to 5 pieces of 35 × 35 mm section and re-charged to the press. The press was closed and no pressure was applied for 2 minutes. Over another 2 minutes the pressure was increased to 8 tons, the press temperature being 260°C. This pressure was maintained for 2 minutes and then the pressure released. The polypropylene foil of 0.1 mm thickness was removed and tempered immediately in a circulating air oven maintained at 150°C. over a period of 60 minutes.

A section measuring 44 × 100 mm was separated from the 0.1 mm tempered polypropylene foil and exposed to light irradiation in a fademeter device consisting of a circular bank of 28 alternate sunlight and blacklight lamps. The sunlight lamps were 2 feet long, 20-watt fluorescent lamps characterised by a peak emission of 3,000 Angstrom units; the blacklight lamps were 2 feet long, 40-watt ultraviolet lamps characterised by a peak emission of 3,500 Angstrom units. The sample was rotated concentrically about the bank of lamps so that the radiation therefrom was uniformly distributed over the section under test.

The exposed sample was examined periodically and the time at which the sample reached 50% of the initial elongation was noted.

Table I

| Example | Additive | Time to reach 50% initial elongation (hours) |
|---|---|---|
| — | None (control) | 125 |
| 2 | 2,4,6-tris[2',2',6',6'-tetramethylpiperidinyl-4'-oxy]-1,3,5-triazine | 625 |

EXAMPLE 3

1000 Parts by weight of unstabilised polypropylene powder were thoroughly dry-blended with 1 part by weight of n-octadecyl-β-(4'-hydroxy-3',5'-di-t-butylphenyl) propionate and 2 parts of the product of Example 1. The dry-blend was extruded at cylinder temperatures of from 180° to 220°C. and the resulting strand was granulated. The stabilised formulation so obtained was melt-spun and stretched under the following conditions:

| | |
|---|---|
| Extruder temperatures | 230/265/275°C. |
| Melt temperature at the dye | 270°C. |
| Spinning Speed | 400 m./minute |
| Stretching Ratio | 1 : 5 |
| Titer of Multifilament | 130/137 denier |
| Tensile Strength | 6 g./denier |

The multifilament obtained was mounted on a sample holder of a Xenotest 150 apparatus (Quarzlampen GmbH) using white cardboard as backing. In intervals of 200 hours of exposure time, 5 fibre samples are measured for their retained tensile strength. The data obtained are plotted against exposure time and the exposure time to give 50% loss of original tensile strength is derived from the graph. This value is taken as the failure time.

The data are shown in the following Table II which also includes data relating to a control experiment omitting the product of Example 1.

Table II

| Example | Additive | Time to failure (hours) |
|---|---|---|
| — | No light stabiliser | 430 |

Table II-continued

| Example | Additive | Time to failure (hours) |
|---|---|---|
| 3 | 2,4,6-tris[2',2',6',6'-tetramethyl piperidinyl-4'-oxy]-1,3,5-triazine | 1750 |

EXAMPLE 4

18.5 Parts of cyanuric chloride were slurried in 600 parts of water and treated with 31.4 parts of 4-amino-2,2,6,6-tetramethylpiperidine. 8 Parts of sodium hydroxide in 20 parts of water were then carefully added and the suspension stirred at room temperature for thirty minutes. The suspension was then heated at 90°C for 16 hours and allowed to cool. 39.5 Parts of a colourless solid, 2-chloro-4,6-bis-(2',2',6',6'-tetramethylpiperidinyl-4'-amino)-1,3,5-triazine were separated by filtration, washed with water and dried in vacuo. This material of melting point 277°–278°C, showed the following elemental analysis by weight:

| | Required for $C_{21}H_{38}N_7Cl$ | Found |
|---|---|---|
| Carbon | 59.32% | 59.54% |
| Hydrogen | 9.25% | 9.09% |
| Nitrogen | 23.06% | 22.89% |
| Chlorine | 8.36% | 8.32% |

EXAMPLE 5

12 Parts of the material obtained in Example 4 were warmed in a solution comprising 920 parts of ethanol and 190 parts of water. 9 Parts of 4-amino-2,2,6,6-tetramethylpiperidine were added and the solution heated at reflux for 16 hours. The solution was then evaporated to dryness and treated with 200 parts of water. Filtration afforded 14.0 parts of a colourless solid 2,4,6-tris[2',2',6',6'-tetramethyl piperidinyl-4'-amino]1,3,5-triazine monohydrate which was purified by Soxhlet extraction of the impurities with petroleum ether (of boiling range 60°–80°C.) The residual material of melting point 213°–215°C, gave the following elemental analysis by weight:

| | Required for $C_{30}H_{57}N_9H_2O$ | Found |
|---|---|---|
| Carbon | 64.12% | 64.01% |
| Hydrogen | 10.58% | 10.42% |
| Nitrogen | 22.44% | 22.21% |

Prolonged heating in vacuo of this compound afforded the anhydrous material of melting point 217° – 219°C.

EXAMPLE 6

8.19 Parts of the material prepared in Example 1 were dissolved in 60 parts of isopropanol and 9 parts of methyl iodide added with water cooling. After 120 hours a solid was separated by filtration and washed with diethyl ether. The solid was dissolved in the minimum amount of water and sodium carbonate added until the solution was basic. Chloroform extraction afforded 2,4,6-tris [1',2',2',6',6'-pentamethylpiperidinyl-4'-oxy]-1,3,5-triazine. This material was crystallised from a 1:1 mixture of chloroform and ethanol to give a colourless solid of melting point 245°–247°C which gave the following elemental analysis by weight.

| | Required for $C_{33}H_{60}N_6O_3$ | Found |
|---|---|---|
| Carbon | 67.31% | 67.36% |
| Hydrogen | 10.27% | 10.22% |
| Nitrogen | 14.27% | 13.99% |

EXAMPLE 7

25.8 Parts of 4-hydroxyl-2,2,6,6-tetramethylpiperidin-1-oxyl and 8.4 parts of potassium hydroxide were dissolved in 500 parts of water. 9.2 parts of cyanuric chloride were carefully added and the solution heated at reflux for 2 hours. 5 Parts of a solid were filtered off and washed with 20 parts of water followed by 20 parts of boiling petroleum ether (boiling range 80°–100°C). After drying this material 2,4,6-tris[1'-oxyl-2',2',6',6'-tetramethylpiperidinyl-4'-oxy]-1,3,5-triazine, gave a melting point of 192°–194°C and the following elemental analysis by weight:

| | Required for $C_{30}H_{51}N_6O_6$ | Found |
|---|---|---|
| Carbon | 60.97% | 60.48% |
| Hydrogen | 8.72% | 8.56% |
| Nitrogen | 14.22% | 13.76% |

EXAMPLE 8

14.75 Parts of cyanuric chloride were carefully added to a mixture of 25 parts of 2,2,6,6-tetra methyl piperidin-4-ol and 13.5 parts of sodium bicarbonate in 250 parts of water. The mixture was stirred and heated to give a clear solution. After 6 hours a colourless precipitate had been produced which was filtered after cooling. The solid was washed three times with 100 parts of water and dried in a vacuum oven to give 13.5 parts of 2-chloro-4,6-bis(2',2',6',6'-tetra methyl piperidinyl-4'-oxy)-1,3,5-triazine monohydrate. This material, of melting point 225°–226°C, showed the following elemental analysis by weight:

| | Required for $C_{21}H_{36}N_5O_2Cl.H_2O$ | Found |
|---|---|---|
| Carbon | 56.79% | 56.50% |
| Hydrogen | 8.63% | 8.72% |
| Nitrogen | 15.78% | 15.71% |
| Chlorine | 7.99% | 7.86% |

EXAMPLE 9

To 10.4 parts of 4-hydroxy-2,2,6,6-tetra methyl piperidin-1-oxyl in 160 parts of dry benzene were added, in portions, 1.38 parts of sodium. This mixture was heated at reflux for 18 hours and then cooled. 3.7 Parts of cyanuric chloride were added with care and the mixture heated at reflux for 18 hours. On cooling the inorganic salt was removed by filtration and the filtrate evaporated in vacuo. Sublimation in vacuo of the residual solid removed unreacted 4-hydroxy-2,2,6,6-tetra methyl piperidin-1-oxyl and the residue was recrystallised three times from absolute ethanol to yield 2-chloro-4,6-bis(1'-oxyl-2',2',6',6'-tetra methyl piperidinyl-4'-oxy)-1,3,5-triazine. This material had a melting point of 197°–199°C and showed the following elemental analysis by weight:

| | Required for $C_{21}H_{34}N_5O_4Cl$ | Found |
|---|---|---|
| Carbon | 55.30% | 55.24% |
| Hydrogen | 7.52% | 7.36% |
| Nitrogen | 15.36% | 15.07% |
| Chlorine | 7.78% | 8.01% |

EXAMPLE 10

To 4.94 parts of 1-benzyl-2,2,6,6-tetra methyl piperidin-4-ol in 100 parts of xylene were added, in portions, 0.8 parts of sodium. This mixture was heated at reflux for 18 hours and then cooled. The excess sodium was removed and 1.2 parts of cyanuric chloride added with care. The mixture was stirred at reflux temperature for 3 hours. Evaporation of the solvent in vacuo afforded a solid which was Soxhlet extracted with petroleum ether (of boiling range 80°–100°C) to give 1.7 parts of a pale yellow solid. column chromatography on silica afforded 2,4,6-tri (1'-benzyl-2',2',6',6'-tetra methyl piperidinyl-4'oxy)-1,3,5-triazine. This material had a melting point of 125°–129°C and showed the required spectroscopic features (Infrared, Nuclear Magnetic Resonance Spectroscopy and Mass Spectrometry).

EXAMPLE 11

4.8 Parts of 2-chloro-4,6-bis(2',2',6',6'-tetra methyl piperidin-4'-amino)-1,3,5-triazine were dissolved in a mixture of 300 parts of toluene and 200 parts tertiary butyl alcohol with warming. A solution of 4 parts of the sodium salt of 2,2,6,6-tetra methyl piperidin-4-ol in 40 parts toluene (as prepared in the above Examples) was added dropwise and the mixture heated at reflux for 18 hours. Evaporation of the solution and treatment of the residue with 15 parts of water afforded 4 parts of a colourless solid which was filtered and dried in vacuo. This material, 2,4-bis[2',2',6',6'-tetra methyl piperidinyl-4'-amino]-6-[2'',2'',6'',6''-tetra methyl piperidinyl-4''-oxy]-1,3,5-triazine, was crystallised from methanol and water to give a melting point of 186.5°–187.5°C and had the following elemental analysis by weight:

|  | Required for $C_{30}H_{56}N_8O \cdot CH_3OH$ | Found |
|---|---|---|
| Carbon | 64.52% | 64.67% |
| Hydrogen | 10.48% | 10.14% |
| Nitrogen | 19.43% | 19.34% |

EXAMPLE 12

4 Parts of 2,4,6-tris[2',2',6',6'-tetra methyl piperidin-4'-amino]-1,3,5-triazine in 100 parts of isopropanol at 5°C were treated with 6.4 parts of iodomethane. The mixture was allowed to stand at room temperature for 3 days. Evaporation in vacuo afforded a residue which was treated with saturated sodium carbonate. Filtration and drying in vacuo afforded a colourless solid which was shown by spectroscopic means to be a partially methylated material. This material was dissolved in 180 parts of isopropanol and treated with 4 parts of iodomethane. The mixture was allowed to stand at room temperature for 3 days. Evaporation in vacuo, followed by treatment with saturated sodium carbonate, afforded a colourless solid, 2,4,6-tris(1',2',2',6',6'-pentamethylpiperidinyl-4'-amino)-1,3,5-triazine, which was filtered and dried in vacuo. This material was column chromatographed on alumina and then recrystallised from methanol and water to give a melting point of 235°–240°C. The compound gave the following elemental analysis by weight:

|  | Required for $C_{33}H_{63}N_9 \cdot H_2O$ | Found |
|---|---|---|
| Carbon | 65.63% | 65.36% |
| Hydrogen | 10.85% | 10.53% |

EXAMPLE 13

To 4.8 parts of 2-chloro-4,6-bis(2',2',6',6'-tetramethyl piperidinyl-4'-amino)-1,3,5-triazine in a mixture of 100 parts of ethanol and 20 parts of water were added 4 parts of 4-(β-aminoethyl)-2,2,6,6-tetra methyl piperidine. The solution was stirred at reflux for 8 hours and then evaporated in vacuo. The residue was dissolved in 25 parts of chloroform and washed with 50 parts of water. The chloroform phase was dried and evaporated to yield 6.0 parts of a colourless solid of melting point 75°C. This material was column chromatographed on alumina to give 2,4-bis(2',2',6',6'-tetra methyl piperidinyl-4'-amino)-6-(2'',2'',6'',6''-tetra methyl piperidinyl-4''-ethylenamino)-1,3,5-triazine of melting point 96°–99°C. This substance showed the following elemental analysis by weight:

|  | Required for $C_{32}H_{61}N_9$ | Found |
|---|---|---|
| Carbon | 67.20% | 66.57% |
| Hydrogen | 10.75% | 10.65% |
| Nitrogen | 22.05% | 21.56% |

EXAMPLE 14

To 3.94 parts of 1-allyl-2,2,6,6-tetramethyl piperidin-4-ol in 100 parts of toluene were added 0.8 parts of sodium. This mixture was heated at reflux for 18 hours and the excess sodium removed. 1.24 Parts of cyanuric chloride were added with care and the solution was stirred at reflux for 4½ hours. The solvent was evaporated in vacuo yielding a residue which was column chromatographed on alumina to give 2-chloro-4,6-bis(1'-allyl-2',2',6',6'-tetra methyl piperidinyl-4'-oxy) 1,3,5-triazine of melting point 167°–170°C. This substance gave the following elemental analysis by weight

|  | Required $C_{27}H_{44}N_5O_2Cl$ | Found |
|---|---|---|
| Carbon | 64.06% | 64.10% |
| Hydrogen | 8.76% | 8.94% |
| Nitrogen | 13.83% | 13.35% |

EXAMPLE 15

5.6 Parts by weight of 2-(2',2',6',6'-tetra methyl piperidinyl-4')ethyl alcohol and 1.4 parts by weight of sodium were heated to reflux for 24 hours in 100 part by volume of toluene. To the resulting solution were added over 20 minutes 1.8 parts by weight of cyanuric chloride in 30 parts by volume of toluene, and the reflux continued for 18 hours. The toluene was then removed by distillation under reduced pressure and the solid suspended in water, this was extracted with ether (3 × 50 parts by volume), and the combined extract dried over magnesium sulphate. The ether was removed by distillation and the residue was triturated with petroleum ether to give a solid which was collected by filtration, dissolved in 20 parts by volume of ethyl alcohol and reprecipitated by the addition of 10 parts by volume of water.

Thus was obtained pure 2,4,6-tris[2',2',6',6'-tetramethyl piperidinyl-4'-ethylenoxy]1,3,5-triazine melting at 104°–6° and having the following elemental analysis by weight:

|  | Required $C_{30}H_{66}N_6O_3$ | Found |
|---|---|---|
| Carbon | 68.51% | 68.54% |
| Hydrogen | 10.57% | 10.48% |
| Nitrogen | 13.31% | 13.40% |

EXAMPLE 16

1.8 Parts by weight of cyanuric chloride and 11.0 parts by weight of 2-(2',2',6',6'-tetramethylpiperidinyl-4') ethylamine were heated at 160° with stirring for 4 hrs. The resulting mass was cooled and the oil decanted off, this was diluted with 100 parts by volume of water and allowed to stand at room temperature for 24 hours. A solid precipitate was filtered, dried, and recrystallised from ethyl acetate (50 parts by volume) to give pure 2,4,6-tris[2',2',6',6'-tetramethylpiperidinyl-4'-ethylenamino]1,3,5-triazine, melting at 169° and having the following elemental analysis by weight:

|  | Required $C_{36}H_{69}N_9$ | Found |
|---|---|---|
| Carbon | 68.85% | 69.09% |
| Hydrogen | 11.07% | 11.16% |
| Nitrogen | 20.07% | 20.02% |

EXAMPLE 17

3.7 Parts of cyanuric chloride were stirred in a mixture of 120 parts of ethanol and 120 parts of water, the temperature being maintained at −15°C. 3.12 Parts of 4-amino-2,2,6,6-tetramethyl piperidine were added whilst maintaining this temperature. After 2 hours, a colourless solid had been precipitated; this material was separated by filtration and dried in vacuo to yield 2,4-dichloro-6-(2',2',6',6'-tetramethyl piperidinyl-4'-amino)-1,3,5-triazine (4.2 parts) as the hydrochloric acid salt. This salt had a melting point of over 275°C. and gave the following elemental analysis by weight:

|  | Required for $C_{12}H_{19}N_5Cl_2 \cdot HCl$ | Found |
|---|---|---|
| Carbon | 42.30% | 42.56% |
| Hydrogen | 5.92% | 6.00% |
| Nitrogen | 20.55% | 20.61% |

EXAMPLE 18

A solution of 7.4 parts by weight of 2-(2',2',6',6'-tetramethyl piperidinyl-4') ethyl amine in 20 parts by volume of toluene was added dropwise to a stirred solution of 1.85 parts by weight of cyanuric chloride in 80 parts by volume of toluene. The resulting suspension was stirred at room temperature for 24 hours, and the solid then collected by filtration and treated with a 10% solution of sodium hydroxide in water for a further 12 hours.

The resulting solid was collected by filtration, washed repeatedly with water until the aqueous washings were pH 6 - 7, dried at 60°C., and purified by reprecipitation from a chloroform solution by the addition of petroleum ether (boiling range 60° - 80°C.) to give 2-chloro-4,6-di [2',2',6',6'-tetramethyl piperidinyl-4'-ethylenamino]-1,3,5-triazine, melting at 168°C. and having the following elemental analysis by weight:

|  | Required for $C_{25}H_{46}ClN_7$ | Found |
|---|---|---|
| Carbon | 62.5% | 62.32% |
| Hydrogen | 9.7% | 9.3% |
| Nitrogen | 7.4% | 7.65% |
| Chlorine | 20.4% | 20.45% |

EXAMPLE 19

38 Parts of polypropylene were homogenised with 0.076 parts of n-octadecyl-β (4'-hydroxy-3',5'-t-butylphenyl) propionate in a kneading machine over a period of 3 minutes at 200°C. 0.19 Part of the product of Example 5 was then added and homogenisation was continued for another 7 minutes.

This composition was compression moulded into films of 0.1 mm. thickness at 260°C. for 6 minutes and the films so obtained were then quenched in cold water.

A section measuring 44 × 100 mm. was separated from the 0.1 mm. annealed polypropylene foil and exposed to light irradiation in a fademeter device consisting of a circular bank of 28 alternate sunlight and blacklight lamps. The sunlight lamps were 2 feet long, 20-watt fluorescent lamps characterised by a peak emission of 3,100 Angstrom units; the blacklight lamps were 2 feet long, 20-watt ultra-violet lamps characterised by a peak emission of 3,500 Angstrom units.

The sample was rotated concentrically about the bank of lamps so that the radiation thereupon was uniformly distributed over the section under test.

The exposed sample was examined periodically and portions of it tested to determine the percentage elongation at break, the time (T) at which the sample reached 50% of the initial elongation at break being noted.

A similar test was carried out on a polypropylene sample containing no stabiliser of the invention.

The results obtained are set out in the following Table:

TABLE

| Ex. | Additive | Factor T/To Time to 50% of initial elongation at break(T) (additive) / Time to 50% of initial elongation at break for control (To) |
|---|---|---|
| — | None | 1 |
| 19 | 2,4,6-Tris(2',2',6',6'-tetramethyl piperidinyl-4'-amino)-1,3,5-triazine | 3.5 |

EXAMPLE 20

5.6 parts of 2-ethylamino-4,6-dichloro-1,3,5-triazine was slurried in 300 parts of water and the mixture heated to a temperature of 55°C. 4.8 parts of 4-amino-2,2,6,6-tetramethylpiperidine were then added followed by 30 parts of 1N sodium hydroxide. The mixture was stirred at 55°C. for six hours. A colourless solid was then filtered off and washed with 700 parts of warm water. 6.0 parts of 2-ethylamino-4-chloro-6-(2',2',6',6'-tetramethylpiperidinyl-4'-amino)-1,3,5-triazine were obtained. This material had a melting point of 189° to 191°C and gave the following elemental analysis by weight:

|  | Required for $C_{14}H_{25}N_6Cl$ | Found |
|---|---|---|
| Carbon | 53.74% | 53.55% |
| Hydrogen | 8.05% | 7.96% |
| Nitrogen | 11.33% | 11.38% |
| Chlorine | 26.86% | 27.10% |

EXAMPLE 21

Using identical conditions to Example 20, 6.2 parts of 2-isopropylamino-4,6-dichloro-1,3,5-triazine were reacted with 4.8 parts of 4-amino-2,2,6,6-tetramethylpiperidine to yield 7 parts of 2-isopropylamino-4-chloro-6-(2',2',6',6'-tetramethylpiperidinyl-4'-amino)-1,3,5-triazine. This substance had a melting point of 174° to 176°C and gave the following elemental analysis by weight.

|  | Required for $C_{15}H_{27}N_6Cl$ | Found |
|---|---|---|
| Carbon | 55.11% | 54.85% |
| Hydrogen | 8.33% | 8.04% |
| Nitrogen | 25.71% | 25.95% |
| Chlorine | 10.85% | 10.98% |

EXAMPLE 22

Using identical conditions to Example 20, 6.7 parts of 2-n-octylthio-4,6-dichloro-1,3,5-triazine were reacted with 3.55 parts of 4-amino-2,2,6,6-tetramethylpiperidine to yield 9.1 parts of 2-n-octylthio-4-chloro-6-(2',2',6',6'-tetramethylpiperidinyl-4'-amino)-1,3,5-triazine. This material had a melting point of 79° to 81°C and gave the following elemental analysis by weight:

|  | Required for $C_{20}H_{36}N_5ClS$ | Found |
|---|---|---|
| Carbon | 58.01% | 57.86% |
| Hydrogen | 8.76% | 8.73% |
| Nitrogen | 16.91% | 16.89% |
| Chlorine | 8.56% | 8.74% |
| Sulphur | 7.74% | 7.44% |

EXAMPLE 23

3.6 parts of 1,2,2,6,6-pentamethylpiperidin-4-ol were heated with 0.6 parts of sodium to reflux temperature in toluene. After 16 hours the solution was cooled, the excess sodium removed and treated with 4.1 parts of 2-chloro-4,6-dimethylthio-1,3,5-triazine. The solution was heated at reflux temperature for 18 hours after which it was cooled and filtered free of sodium chloride. The solvent was evaporated under reduced pressure to yield a residue which was crystallised from petroleum ether (of boiling point 60°–80°C). Two parts of 2,4-dimethylthio-6-[1',2',2',6',6'-pentamethylpiperidinyl-4'-oxy]-1,3,5-triazine were obtained which showed a melting point of 143° to 145°C and gave the following elemental analysis by weight:

|  | Required for $C_{15}H_{26}N_4OS_2$ | Found |
|---|---|---|
| Carbon | 52.62% | 52.66% |
| Hydrogen | 7.65% | 7.64% |
| Nitrogen | 16.36% | 16.13% |

EXAMPLE 24

2.4 parts of 2-chloro-4,6-bis-[2',2',6',6'-tetramethylpiperidinyl-4'-amino]-1,3,5-triazine were treated with 1.2 parts of isopropylamine in 40 parts of water. The solution was stirred at room temperature for 18 hours, at reflux temperature for four hours and then cooled and evaporated to yield 1.6 parts of material. This residue was treated with 10 parts of dilute sodium hydroxide and extracted twice with 50 parts of chloroform. After drying and removal of the solvent a semi-solid material was obtained which on addition of two parts of metanol yielded a colourless solid 2-isopropylamino-4,6-bis-[2',2',6',6'-tetramethylpiperidinyl-4'-amino]-1,3,5-triazine of melting point 120° to 122°C. It showed the following elemental analysis by weight:

|  | Required for $C_{24}H_{48}N_8CH_3OH$ | Found |
|---|---|---|
| Carbon | 62.72% | 62.60% |
| Hydrogen | 10.53% | 9.98% |
| Nitrogen | 23.42% | 23.92% |

EXAMPLE 25

0.36 parts of sodium were added to 150 parts of ethanol and the solution treated with 6.6 parts of 2-chloro-4,6-bis-[2',2',6',6'-tetramethylpiperidinyl-4'-amino]-1,3,5-triazine. The mixture was stirred and heated at reflux for 16 hours after which the solution was cooled and filtered. Evaporation of the filtrate in vacuo afforded 6.6 parts of a colourless solid which was chromatographed on an alumina column to yield 2-ethoxy-4,6-bis-(2',2',6',6'-tetramethylpiperidinyl-4'-amino)-1,3,5-triazine. This material has a melting point of 189° to 191°C and gave the following elemental analysis by weight:

|  | Required for $C_{23}H_{43}N_7O \cdot H_2O$ | Found |
|---|---|---|
| Carbon | 61.40% | 61.41% |
| Hydrogen | 10.05% | 9.87% |
| Nitrogen | 21.70% | 21.46% |

EXAMPLE 26

6.28 Parts of 4-amino-2,2,6,6-tetramethylpiperidine were dissolved in 100 parts of toluene and 4.1 parts of 2-chloro-4,6-di(methylthio)-1,3,5-triazine were carefully added. The solution was stirred at reflux temperature for 6 hours. 6 Parts of a solid were filtered off and dried. This material was treated with 30 parts of saturated sodium carbonate solution and extracted with 300 parts of chloroform. The organic extract was dried and evaporated to yield a colourless tacky solid. Column chromatography on alumina afforded pure 2-(2',2',6',6'-tetramethylpiperidinyl-4'-amino)-4,6-di(methylthio-1,3,5-triazine. This material was recrystallized from ethanol and had a melting point of 173° to 175°C. It showed the following elemental analysis by weight:

|  | Required for $C_{14}H_{26}N_5S_2$ | Found |
|---|---|---|
| Carbon | 51.36% | 51.63% |
| Hydrogen | 7.70% | 7.93% |
| Nitrogen | 21.39% | 21.45% |

EXAMPLE 27

1.4 Parts of sodium and 6.28 parts of 2,2,6,6-tetramethylpiperidin-4-ol was heated at reflux temperature for 24 hours in 100 parts of toluene. To this cooled solution was added 3.86 parts of 2-ethyl-amino-4,6-dichloro-1,3,5-triazine and the mixture heated at reflux for 2 hours. Evaporation of the solvent in vacuo afforded a material which was extracted with chloroform using a Soxhlet extractor. The extract was evaporated to yield a colourless solid which was chromatographed on an alumina column and then crystallised from ethyl acetate, to give pure 2-ethylamino-4,6-bis[2',2',6',6'-tetramethylpiperidinyl-4'-oxy]-1,3,5-triazine which showed a melting point of 189.5° to 190.5° and the following elemental analysis by weight:

|  | Required for $C_{23}H_{42}N_6O_2$ | Found |
|---|---|---|
| Carbon | 63.54% | 63.63% |
| Hydrogen | 9.74% | 9.77% |
| Nitrogen | 19.34% | 19.24% |

EXAMPLE 28

3 Parts of 2,4-dichloro-6-(2',2',6',6'-tetramethylpiperidinyl-4'-amino)-1,3,5-triazine hydrochloric acid salt were dissolved in 400 parts of a 1;1 mixture of ethanol and water. 1.18 Parts of n-propyl-amine were added and the solution heated at reflux for 18 hours. Evaporation of the solvent afforded a colourless solid which was crystallised from the solvent mixture methanol/petroleum ether (of boiling range 60°–80°λ)/ethyl acetate to give pure 2-chloro-4-n-propyl-amino-6-(2',2',6',6'-tetramethylpiperidyl-4'-amino)-1,3,5-triazine hydrochloric acid salt of melting point greater than 270° and which gave the following analysis by weight:

|  | Required for $C_{15}H_{28}N_6Cl_2$ | Found |
|---|---|---|
| Carbon | 49.61% | 49.26% |
| Hydrogen | 7.77% | 7.80% |
| Nitrogen | 23.15% | 22.54% |

EXAMPLE 29

A solution of 2.1 parts by weight of 2-chloro-4,6-di(-methylthio)-1,3,5-triazine and 4.0 parts by wieght of 2(1',2',2',6',6'-pentamethylpiperidinyl-4')-ethylamine in 50 parts by volume of toluene was heated at reflux for 4 hours. The toluene was then filtered and removed by distillation under reduced pressure to give a residual oil, which by trituration with petroleum ether (boiling range 40°–60°) gave a white solid. recystallisation from 25 parts by volume of petroleum ether (60°–80°) gave pure 2-(1',2',2',6',6'-pentamethylpiperidinyl-4'-ethylenamino)-4,6-di(methylthio-1,3,5-triazine, melting at 119° and having the following elemental analysis by weight:

|  | Required by $C_{17}H_{31}N_5S_2$ | Found |
|---|---|---|
| Carbon | 55.27% | 55.22% |
| Hydrogen | 8.46% | 8.62% |
| Nitrogen | 18.96% | 19.10% |
| Sulphur | 17.32% | 17.15% |

EXAMPLE 30

1.5 Parts of 2-chloro-4,6-bis[2',2',6',6'-tetramethyl-piperidinyl-4'-amino]-1,3,5-triazine were dissolved in 130 parts of an ethanol/water (5:1) mixture and 4 parts of dimethylamine in ethanol solution (33%) added. The mixture was heated in a rocking autoclave at a temperature of 100°C and a pressure of 20 atmospheres nitrogen for 24 hours. The solution was filtered and the filtrate evaporated in vacuo to yield a pale brown solid. Charcoal treatment of this material removed the colour and the product was Soxhlet extracted with petroleum ether (of boiling range 60°–80°) for 24 hours to yield 2-dimethylamino-4,6-bis[2',2',6',6'-tetramethylpiperidinyl-4'-amino]-1,3,5-triazine monohydrate as a colourless solid. It showed a melting point of 230° to 233°C, a molecular weight of 432 by mass spectrometry and the following elemental analysis by weight:

|  | Required for $C_{23}H_{44}N_8.H_2O$ | Found |
|---|---|---|
| Carbon | 61.92% | 61.31% |
| Hydrogen | 10.25% | 10.28% |
| Nitrogen | 24.62% | 24.87% |

EXAMPLE 31

3 Parts of 2-chloro-4,6-bis[2',2',6',6'-tetramethyl-piperidin-yl-4'-amino]-1,3,5-triazine were dissolved in a mixture of 225 parts of ethanol and 46 parts of water with stirring and heating. 1.26 Parts of morpholine were added and the solution heated at reflux for 24 hours. The solution was then evaporated in vacuo and 50 parts of water added. After stirring for 30 minutes the solution was filtered and the filtered material treated with 50 parts of saturated sodium carbonate solution and extracted with 200 parts of chloroform. The extract was dried and evaporated in vacuo to yield 2-morpholino-4,6-bis[2',2',6',6'-tetramethylpiperidinyl-4'-amino]-1,3,5-triazine dihydrate as a colourless solid of melting point 179°–181°C. This solid had a molecular weight of 474 by mass spectrometry and showed the following elemental analysis by weight:

|  | Required for $C_{25}H_{46}N_8O.2H_2O$ | Found |
|---|---|---|
| Carbon | 58.78% | 58.60% |
| Hydrogen | 9.87% | 9.32% |
| Nitrogen | 21.95% | 22.06% |

EXAMPLE 32

2.2 Parts of 2-chloro-4,6-bis[2',2',6',6'-tetramethyl-piperidinyl-4'-amino]-1,3,5-triazine and 1.07 parts of benzylamino were heated at reflux in a mixture of 150 parts of ethanol and 30 parts of water for 18 hours. An evaporation of the solvent, a material was obtained which was chromatographed on an Alumina column. Crystallisation from water gave 2-benzylamino-4,6-bis[2',2',6',6'-tetramethylpiperidinyl-4'-amino]-1,3,5-triazine monohydrate as a colourless solid of melting point 98° to 100°C. It gave the following elemental analysis by weight:

|  | Required for $C_{28}H_{46}N_8.H_2O$ | Found |
|---|---|---|
| Carbon | 65.60% | 65.77% |
| Hydrogen | 9.42% | 9.40% |
| Nitrogen | 21.82% | 21.81% |

EXAMPLE 33

2 Parts of 2-chloro-4,6-bis[2',2',6',6'-tetramethyl-piperidinyl-4'-oxy]-1,3,5-triazine and 2.48 parts of 4-amino-2,2,6,6-tetramethylpiperidine were heated at reflux with a mixture of 42 parts ethanol and 20 parts water for 18 hours. A pure colourless solid was filtered from the solution which had a melting point of over 280°C and a molecular weight of 406 by mass spectrometry. This material was the hydrochloric acid salt of 2-amino-4,6-bis[2',2',6',6'-tetramethylpiperidinyl-4'-amino]-1,3,5-triazine and showed the following elemental analysis by weight:

|  | Required for $C_{21}H_{38}N_6O_2.HCl$ | Found |
|---|---|---|
| Carbon | 56.92% | 56.96% |
| Hydrogen | 8.87% | 8.71% |
| Nitrogen | 18.97% | 19.28% |

EXAMPLE 34

3.6 Parts of 2,4,6-trichloropyrimidine were dissolved in a mixture of 12 parts of water and 20 parts of dioxane and the solution stirred and cooled to 5°C. 3 Parts of 4-amino-2,2,6,6-tetramethylpiperidine were then added slowly maintaining a temperature of below 10°C. 0.8 Parts of sodium hydroxide in 2 parts of water were added and the solution stirred at room temperature for 1 hour. 4.4 Parts of 4-amino-2,2,6,6-tetramethylpiperidine were then added followed by 0.8 parts sodium hydroxide in 2 parts of water. The resultant solution was then stirred at reflux temperature for 18 hours. A solid material was filtered off, treated with 100 parts of saturated sodium carbonate solution and extracted with 200 parts of chloroform. The extract was dried and evaporated to yield a solid, 6-chloro-2,4-bis[2',2',6',6'-tetramethylpiperidinyl-4'-amino]-1,3-pyrimidine monohydrate which was recrystallized from chloroform/petroleum ether (of boiling range 40°–60°) to give a melting point of 198° to 199.5°C and the following elemental analysis by weight:

|  | Required for $C_{22}H_{39}N_6Cl·H_2O$ | Found |
|---|---|---|
| Carbon | 59.91% | 59.63% |
| Hydrogen | 9.37% | 9.11% |
| Nitrogen | 19.05% | 18.75% |

We claim:
1. A compound of the formula

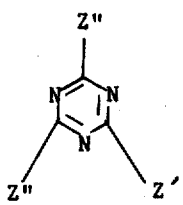

and salts thereof,
Z' is a group having the formula:

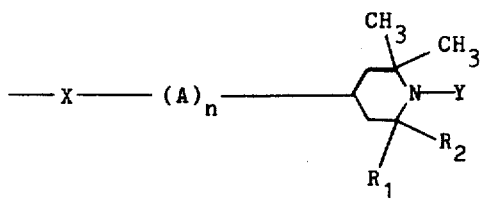

wherein $R_1$ and $R_2$ are the same or different and each is a straight or branched alkyl of 1 to 12 carbon atoms or $R_1$ and $R_2$ form together with the ring carbon atom to which they are bound, a cycloalkyl group having from 5 to 12 carbon atoms;

X is $-O-$, $-S-$ or $-N-$, wherein
$\quad\quad\quad\quad\quad\quad\quad\quad\quad\;\; |$
$\quad\quad\quad\quad\quad\quad\quad\quad\quad\;\; R_7$ wherein $R_7$ is hydrogen, a straight- or branched alkyl of 1 to 20 carbon atoms or benzyl; Y is 0', hydrogen, a straight- or branched alkyl of 1 to 20 carbon atoms, an alkenyl or alkynyl of 3 to 12 carbon atoms, an aralkyl having from 7 to 11 carbon atoms or the group

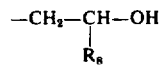

wherein $R_8$ is hydrogen, methyl or phenyl; n is 0 or 1; and A is $-CH_2-$, or the group

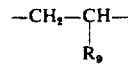

wherein $R_9$ is a hydrogen or alkyl of 1 to 20 carbon atoms; Z'' and Z''' are the same or different and each is a piperidine group of formula II as hereinbefore defined, a halogen atom, a substituted amino group having the formula:

wherein $R_3$ and $R_4$ are the same of different and each is hydrogen a straight or branched alkyl of 1 to 20 carbon atoms, a cycloalkyl of 5 to 12 carbon atoms, an aryl which is unsubstituted or substituted with one or more alkyl groups and having a total of from 6 to 18 carbon atoms or an aralkyl having from 7 to 12 carbon atoms, or $R_3$ and $R_4$ together with the nitrogen atom to which they are bound, form a nitrogen containing ring having 5 to 7 ring atoms; or Z'' and Z''' are a hydroxy or an ether group having the formula:

$\quad\quad\quad\quad -OR_5 \quad\quad\quad\quad\quad\quad IV$ wherein $R_5$ is hydrogen, a straight or brached chain alkyl of 1 to 20 carbon atoms, a cycloalkyl of 5 to 12 carbon atoms, an aryl which is unsubstituted or substituted by one or more alkyl groups and having a total of 6 to 18 carbon atoms, or an aralkyl having from 7 to 12 carbon atoms;
or Z'' and Z''' are a thiol or thio ether group having the formula:

$\quad\quad\quad\quad -SR_6 \quad\quad\quad\quad\quad\quad V$ wherein $R_6$ is hyrogen, a straight or branched alkyl of 1 to 20 carbon atoms or a cycloalkyl of 5 to 12 carbon atoms.

2. A compound according to claim 1 having the formula

and salts thereof, where D', D'' and D''' are the same or different and each is halogen or a group of the formula:

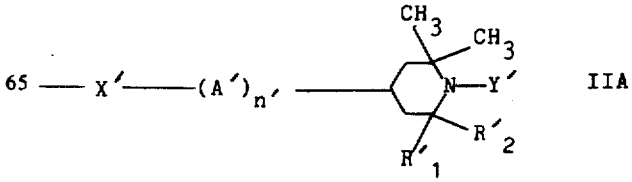

wherein $R'_1$ and $R'_2$ are the same or different and each is a straight or branched alkyl of 1 to 12 carbon atoms, or $R'_1$ and $R'_2$, together with the carbon atom to which they are bound, form a cycloalkyl of 5 to 12 carbon atoms, X' is an —O—, —S— or $R'_7$ wherein $R'_7$ is hydrogen, an alkyl of 1 to 12 carbon atoms or an aralkyl of 7 to 12 carbon atoms Y' is 0, hydrogen, an alkyl of 1 to 12 carbon atoms, an alkenyl or alkynyl of 3 to 12 carbon atoms, an aralkyl of 7 to 12 carbon atoms or the group:

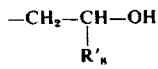

wherein $R'_8$ is hydrogen, or a methyl or phenyl, $n'$ is 0 or 1 and A' is —CH$_2$—, —CH$_2$CH$_2$— or

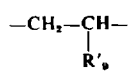

wherein $R'_9$ is an alkyl of 1 to 12 carbon atoms, with the proviso that at least one of D', D'' and D''' is not a halogen atom.

3. A compound according to claim 2, wherein X is —O— or —NH, n is O, $R_1$ and $R_2$ are each methyl and Y is hydrogen or a methyl.

4. A compound according to claim 2, wherein D, D and D are the same or different piperidine of formula IIA.

5. A compound according the claim 1 having the formula:

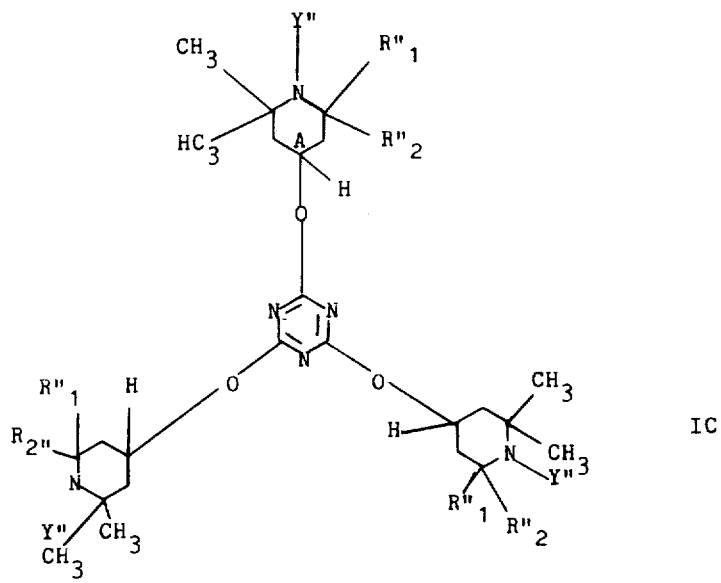

IC and salts thereof, wherein $R''_1$ and $R''_2$ are the same or different and each is a straight or branched chain alkyl group having from 1 to 12 carbon atoms or $R''_1$ and $R''_2$, together with the carbon atom to which they are each bound, form a cycloalkyl of 5 to 12 carbon atoms, and Y'', is hydrogen a straight or branched chain alkyl group having from 1 to 12 carbon atoms, an alkenyl group having from 3 to 12 carbon atoms or an aralkyl group having from 7 to 12 carbon atoms.

6. A compound according to claim 5, wherein $R''_1$ and $R''_2$ are each methyl and Y'' is hydrogen or a methyl.

7. A compound according to claim 1 which is 2,4,6-tris[2',2',6',6'-tetramethylpiperidinyl-4'-oxy]-1,3,5-triazine.

8. A compound according to claim 1 which is 2,4,6-tris]2',2',6',6'-tetramethyl piperidinyl-4'-amino]-1,3,5-triazine.

9. A compound according to claim 1 which is 2,4,6-tris-[1'2',2',6',6'-pentamethylpiperidinyl-4'-oxy]-1,3,5-trizine.

10. A compound according to claim 1 which is 2,4,6-tris-[1-oxyl-2',2',6',6'-tetramethylpiperidinyl-4'-oxyl]-1,3,5-triazine.

11. A compound according to claim 1 which is 2-chloro-4,6-bis-[1'-oxyl-2',2',6',6',-tetramethyl-piperidinyl-4'-oxy]-1,3,5-triazine.

* * * * *